US012807177B2

(12) United States Patent
Duan et al.

(10) Patent No.: US 12,807,177 B2
(45) Date of Patent: Nov. 24, 2026

(54) VISION-BASED SYSTEM TRAINING WITH SIMULATED CONTENT

(71) Applicant: Tesla, Inc., Austin, TX (US)

(72) Inventors: Pengfei Phil Duan, Austin, TX (US); Nishant Desai, Austin, TX (US); Philip Lee, Austin, TX (US)

(73) Assignee: Tesla, Inc., Austin, TX (US)

( * ) Notice: Subject to any disclaimer, the term of this patent is extended or adjusted under 35 U.S.C. 154(b) by 222 days.

(21) Appl. No.: 18/684,589

(22) PCT Filed: Aug. 18, 2022

(86) PCT No.: PCT/US2022/040784
§ 371 (c)(1),
(2) Date: Feb. 16, 2024

(87) PCT Pub. No.: WO2023/023265
PCT Pub. Date: Feb. 23, 2023

(65) Prior Publication Data

US 2024/0355132 A1 Oct. 24, 2024

Related U.S. Application Data

(60) Provisional application No. 63/287,936, filed on Dec. 9, 2021, provisional application No. 63/260,439, filed on Aug. 19, 2021.

(51) Int. Cl.
*G06K 9/00* (2022.01)
*B60W 60/00* (2020.01)
(Continued)

(52) U.S. Cl.
CPC ............. *B60W 60/001* (2020.02); *G06T 7/13* (2017.01); *G06T 7/20* (2013.01); *G06V 10/774* (2022.01);
(Continued)

(58) Field of Classification Search
CPC ... G06T 7/13; G06T 7/20; G06T 2207/20081; G06T 2207/30241; G06T 2207/30252;
(Continued)

(56) References Cited

U.S. PATENT DOCUMENTS 6,882,755 B2 4/2005 Silverstein et al.
7,209,031 B2 4/2007 Nakai et al.
(Continued)

FOREIGN PATENT DOCUMENTS

AU 2019261735 A1 5/2016
AU 2019201716 A1 10/2020
(Continued)

OTHER PUBLICATIONS

An LSTM-Based Autonomous Driving Model Using a WaymoOpenDataset, Zhicheng Gu et al., MDPI, 2020, pp. 1-14 (Year: 2020).*

(Continued)

*Primary Examiner* — Jayesh A Patel
(74) *Attorney, Agent, or Firm* — Foley & Lardner LLP

(57) ABSTRACT

Aspects of the present application correspond to utilization of a combined set of inputs to generate or train machine learned algorithms for utilization in vehicles with vision system-only based processing. A network service can receive a first set of inputs (e.g., a first data set) from a target vehicle including captured vision system data at a first point in time. The network service can receive a second set of inputs (e.g., a second data set) from the target vehicle including captured vision system data at a second point in time. The second point in time is subsequent to the first point in time. Based on the second set of ground truth labels and values, the network service can then determine or derive labels and associated values for the first set of ground truth labels and values.

18 Claims, 7 Drawing Sheets

(51) Int. Cl.

| | |
|---|---|
| ***G06T 7/13*** | (2017.01) |
| ***G06T 7/20*** | (2017.01) |
| ***G06V 10/774*** | (2022.01) |
| ***G06V 20/56*** | (2022.01) |
| ***G06V 20/58*** | (2022.01) |
| ***G06V 20/70*** | (2022.01) |

(52) U.S. Cl.
CPC .............. *G06V 20/56* (2022.01); *G06V 20/58* (2022.01); *G06V 20/588* (2022.01); *G06V 20/70* (2022.01); *B60W 2420/403* (2013.01); *B60W 2552/53* (2020.02); *G06T 2207/20081* (2013.01); *G06T 2207/30241* (2013.01); *G06T 2207/30252* (2013.01)

(58) Field of Classification Search
CPC ...... G06V 10/774; G06V 20/56; G06V 20/58; G06V 20/588; G06V 20/70; G06V 10/776
See application file for complete search history.

(56) References Cited

U.S. PATENT DOCUMENTS

| | | | |
|---|---|---|---|
| 7,391,907 | B1 | 6/2008 | Venetianer et al. |
| 7,747,070 | B2 | 6/2010 | Puri |
| 7,904,867 | B2 | 3/2011 | Burch et al. |
| 7,974,492 | B2 | 7/2011 | Nishijima |
| 8,165,380 | B2 | 4/2012 | Choi et al. |
| 8,369,633 | B2 | 2/2013 | Lu et al. |
| 8,406,515 | B2 | 3/2013 | Cheatle |
| 8,509,478 | B2 | 8/2013 | Haas et al. |
| 8,588,470 | B2 | 11/2013 | Rodriguez Serrano et al. |
| 8,744,174 | B2 | 6/2014 | Hamada et al. |
| 8,773,498 | B2 | 7/2014 | Lindbergh |
| 8,874,266 | B1 | 10/2014 | Francis et al. |
| 8,912,476 | B2 | 12/2014 | Fogg |
| 8,913,830 | B2 | 12/2014 | Sun et al. |
| 8,928,753 | B2 | 1/2015 | Han et al. |
| 8,972,095 | B2 | 3/2015 | Furuno |
| 8,976,269 | B2 | 3/2015 | Duong |
| 9,008,422 | B2 | 4/2015 | Eid et al. |
| 9,081,385 | B1 | 7/2015 | Ferguson et al. |
| 9,275,289 | B2 | 3/2016 | Li et al. |
| 9,586,455 | B2 | 3/2017 | Sugai et al. |
| 9,606,539 | B1 | 3/2017 | Kentley et al. |
| 9,632,502 | B1 | 4/2017 | Levinson et al. |
| 9,672,437 | B2 | 6/2017 | Mccarthy |
| 9,710,696 | B2 | 7/2017 | Wang et al. |
| 9,738,223 | B2 | 8/2017 | Zhang et al. |
| 9,754,154 | B2 | 9/2017 | Craig et al. |
| 9,767,369 | B2 | 9/2017 | Furman et al. |
| 9,965,865 | B1 | 5/2018 | Agrawal et al. |
| 10,031,526 | B1 * | 7/2018 | Li ........................ G05D 1/0246 |
| 10,049,328 | B2 * | 8/2018 | Jiang ................ G08G 1/096725 |
| 10,133,273 | B2 | 11/2018 | Linke |
| 10,140,252 | B2 | 11/2018 | Fowers et al. |
| 10,140,544 | B1 | 11/2018 | Zhao et al. |
| 10,146,225 | B2 | 12/2018 | Ryan |
| 10,152,655 | B2 | 12/2018 | Krishnamurthy |
| 10,167,800 | B1 | 1/2019 | Chung et al. |
| 10,169,680 | B1 | 1/2019 | Sachdeva et al. |
| 10,192,016 | B2 | 1/2019 | Ng et al. |
| 10,216,189 | B1 | 2/2019 | Haynes |
| 10,228,693 | B2 | 3/2019 | Micks |
| 10,242,293 | B2 | 3/2019 | Shim |
| 10,248,121 | B2 | 4/2019 | Vandenberg |
| 10,262,218 | B2 | 4/2019 | Lee et al. |
| 10,282,623 | B1 | 5/2019 | Ziyaee et al. |
| 10,296,828 | B2 | 5/2019 | Viswanathan |
| 10,303,961 | B1 | 5/2019 | Stoffel |
| 10,310,087 | B2 | 6/2019 | Laddha et al. |
| 10,311,312 | B2 | 6/2019 | Yu |
| 10,318,848 | B2 | 6/2019 | Dijkman et al. |
| 10,325,178 | B1 | 6/2019 | Tang |
| 10,331,974 | B2 | 6/2019 | Zia et al. |
| 10,338,600 | B2 | 7/2019 | Yoon et al. |
| 10,343,607 | B2 | 7/2019 | Kumon |
| 10,359,783 | B2 | 7/2019 | Williams et al. |
| 10,366,290 | B2 | 7/2019 | Wang |
| 10,372,130 | B1 | 8/2019 | Kaushansky et al. |
| 10,373,019 | B2 | 8/2019 | Nariyambut Murali et al. |
| 10,373,026 | B1 | 8/2019 | Kim |
| 10,380,741 | B2 | 8/2019 | Yedla et al. |
| 10,394,237 | B2 | 8/2019 | Xu et al. |
| 10,395,144 | B2 | 8/2019 | Zeng et al. |
| 10,402,646 | B2 | 9/2019 | Klaus |
| 10,402,986 | B2 | 9/2019 | Ray et al. |
| 10,414,395 | B1 | 9/2019 | Sapp |
| 10,423,934 | B1 | 9/2019 | Zanghi et al. |
| 10,436,615 | B2 | 10/2019 | Agarwal et al. |
| 10,452,905 | B2 | 10/2019 | Segalovitz |
| 10,460,053 | B2 | 10/2019 | Olson et al. |
| 10,467,459 | B2 | 11/2019 | Chen |
| 10,468,008 | B2 | 11/2019 | Beckman et al. |
| 10,468,062 | B1 | 11/2019 | Levinson |
| 10,470,510 | B1 | 11/2019 | Koh et al. |
| 10,474,160 | B2 | 11/2019 | Huang et al. |
| 10,474,161 | B2 | 11/2019 | Huang et al. |
| 10,474,928 | B2 | 11/2019 | N |
| 10,489,126 | B2 | 11/2019 | Kumar et al. |
| 10,489,972 | B2 | 11/2019 | Atsmon |
| 10,497,264 | B2 | 12/2019 | Rowell |
| 10,503,971 | B1 | 12/2019 | Dang et al. |
| 10,514,711 | B2 | 12/2019 | Bar-Nahum et al. |
| 10,528,824 | B2 | 1/2020 | Zou |
| 10,529,078 | B2 | 1/2020 | Abreu et al. |
| 10,529,088 | B2 | 1/2020 | Fine et al. |
| 10,534,854 | B2 | 1/2020 | Sharma et al. |
| 10,535,191 | B2 | 1/2020 | Sachdeva et al. |
| 10,542,930 | B1 | 1/2020 | Sanchez |
| 10,546,197 | B2 | 1/2020 | Shrestha et al. |
| 10,546,217 | B2 | 1/2020 | Albright et al. |
| 10,552,682 | B2 | 2/2020 | Jonsson et al. |
| 10,559,386 | B1 | 2/2020 | Neumann |
| 10,565,475 | B2 | 2/2020 | Lecue |
| 10,567,674 | B2 | 2/2020 | Kirsch |
| 10,568,570 | B1 | 2/2020 | Sherpa |
| 10,572,717 | B1 | 2/2020 | Zhu |
| 10,574,905 | B2 | 2/2020 | Srikanth et al. |
| 10,579,058 | B2 | 3/2020 | Oh |
| 10,579,063 | B2 | 3/2020 | Haynes et al. |
| 10,579,897 | B2 | 3/2020 | Redmon et al. |
| 10,586,280 | B2 | 3/2020 | Mckenna et al. |
| 10,591,914 | B2 | 3/2020 | Palanisamy et al. |
| 10,592,785 | B2 | 3/2020 | Zhu et al. |
| 10,599,701 | B2 | 3/2020 | Liu |
| 10,599,930 | B2 | 3/2020 | Lee et al. |
| 10,599,958 | B2 | 3/2020 | He et al. |
| 10,606,990 | B2 | 3/2020 | Tuli et al. |
| 10,609,434 | B2 | 3/2020 | Singhai |
| 10,614,344 | B2 | 4/2020 | Anthony et al. |
| 10,621,513 | B2 | 4/2020 | Deshpande |
| 10,627,818 | B2 | 4/2020 | Sapp et al. |
| 10,628,432 | B2 | 4/2020 | Guo |
| 10,628,686 | B2 | 4/2020 | Ogale et al. |
| 10,628,688 | B1 | 4/2020 | Kim et al. |
| 10,629,080 | B2 | 4/2020 | Kazemi |
| 10,636,161 | B2 | 4/2020 | Uchigaito |
| 10,636,169 | B2 | 4/2020 | Estrada et al. |
| 10,642,275 | B2 | 5/2020 | Silva et al. |
| 10,643,320 | B2 | 5/2020 | Lee et al. |
| 10,645,344 | B2 | 5/2020 | Marman et al. |
| 10,649,464 | B2 | 5/2020 | Gray |
| 10,650,071 | B2 | 5/2020 | Asgekar et al. |
| 10,652,565 | B1 | 5/2020 | Zhang |
| 10,656,657 | B2 | 5/2020 | Djuric |
| 10,657,391 | B2 | 5/2020 | Chen et al. |
| 10,657,418 | B2 | 5/2020 | Marder |
| 10,657,934 | B1 | 5/2020 | Kolen et al. |
| 10,661,902 | B1 | 5/2020 | Tavshikar |
| 10,664,750 | B2 | 5/2020 | Greene |
| 10,671,082 | B2 | 6/2020 | Huang et al. |
| 10,671,886 | B2 | 6/2020 | Price et al. |
| 10,678,244 | B2 | 6/2020 | Iandola et al. |

(56) References Cited

U.S. PATENT DOCUMENTS 10,678,839 B2 6/2020 Gordon et al.
10,678,997 B2 6/2020 Ahuja et al.
10,679,129 B2 6/2020 Baker
10,684,626 B1 6/2020 Martin
10,685,159 B2 6/2020 Su
10,685,188 B1 6/2020 Zhang et al.
10,692,000 B2 6/2020 Surazhsky
10,692,242 B1 6/2020 Morrison et al.
10,693,740 B2 6/2020 Coccia
10,698,868 B2 6/2020 Guggilla
10,699,119 B2 6/2020 Lo et al.
10,699,140 B2 6/2020 Kench et al.
10,699,477 B2 6/2020 Levinson
10,713,502 B2 7/2020 Tiziani
10,719,759 B2 7/2020 Kutliroff
10,725,475 B2 7/2020 Yang et al.
10,726,264 B2 7/2020 Sawhney et al.
10,726,279 B1 7/2020 Kim et al.
10,726,374 B1 7/2020 Engineer
10,732,261 B1 8/2020 Wang et al.
10,733,262 B2 8/2020 Miller et al.
10,733,482 B1 8/2020 Lee et al.
10,733,506 B1 8/2020 Ogale et al.
10,733,638 B1 8/2020 Jain et al.
10,733,755 B2 8/2020 Liao et al.
10,733,876 B2 8/2020 Moura
10,740,563 B2 8/2020 Dugan
10,740,694 B2 8/2020 Harvill et al.
10,740,914 B2 8/2020 Xiao et al.
10,748,062 B2 8/2020 Rippel et al.
10,748,247 B2 8/2020 Paluri
10,751,879 B2 8/2020 Li
10,755,112 B2 8/2020 Mabuchi
10,755,575 B2 8/2020 Johnston et al.
10,757,330 B2 8/2020 Ashrafi
10,762,396 B2 9/2020 Vallespi-Gonzalez et al.
10,768,628 B2 9/2020 Martin et al.
10,768,629 B2 9/2020 Song et al.
10,769,446 B2 9/2020 Chang et al.
10,769,483 B2 9/2020 Nirenberg et al.
10,769,493 B2 9/2020 Yu et al.
10,769,494 B2 9/2020 Xiao
10,769,525 B2 9/2020 Redding et al.
10,776,626 B1 9/2020 Lin et al.
10,776,673 B2 9/2020 Kim
10,776,939 B2 9/2020 Ma et al.
10,779,760 B2 9/2020 Lee et al.
10,783,381 B2 9/2020 Yu et al.
10,783,454 B2 9/2020 Shoaib et al.
10,789,402 B1 9/2020 Vemuri
10,789,544 B2 9/2020 Fiedel et al.
10,790,919 B1 9/2020 Kolen et al.
10,796,221 B2 10/2020 Zhang et al.
10,796,355 B1 10/2020 Price et al.
10,796,423 B2 10/2020 Goja
10,798,368 B2 10/2020 Briggs et al.
10,803,325 B2 10/2020 Bai et al.
10,803,328 B1 10/2020 Bai et al.
10,803,743 B2 10/2020 Abari
10,805,629 B2 10/2020 Liu et al.
10,809,730 B2 10/2020 Chintakindi
10,810,445 B1 10/2020 Kangaspunta
10,816,346 B2 10/2020 Wheeler et al.
10,816,992 B2 10/2020 Chen
10,817,731 B2 10/2020 Vallespi-Gonzalez et al.
10,817,732 B2 10/2020 Porter et al.
10,819,923 B1 10/2020 Mccauley
10,824,122 B2 11/2020 Mummadi et al.
10,824,862 B2 11/2020 Qi et al.
10,828,790 B2 11/2020 Nemallan
10,832,057 B2 11/2020 Chan et al.
10,832,093 B1 11/2020 Taralova
10,832,414 B2 11/2020 Pfeiffer
10,832,418 B1 11/2020 Karasev
10,833,785 B1 11/2020 O'Shea et al.
10,836,379 B2 11/2020 Xiao
10,838,936 B2 11/2020 Cohen
10,839,230 B2 11/2020 Charette et al.
10,839,578 B2 11/2020 Coppersmith, III
10,843,628 B2 11/2020 Kawamoto et al.
10,845,820 B2 11/2020 Wheeler
10,845,943 B1 11/2020 Ansari et al.
10,846,831 B2 11/2020 Raduta
10,846,888 B2 11/2020 Kaplanyan et al.
10,853,670 B2 12/2020 Sholingar
10,853,739 B2 12/2020 Truong et al.
10,860,919 B2 12/2020 Kanazawa et al.
10,860,924 B2 12/2020 Burger
10,867,444 B2 12/2020 Russell et al.
10,871,444 B2 12/2020 Al Shehri et al.
10,871,782 B2 12/2020 Milstein et al.
10,872,204 B2 12/2020 Zhu et al.
10,872,254 B2 12/2020 Mangla et al.
10,872,326 B2 12/2020 Garner
10,872,531 B2 12/2020 Liu et al.
10,885,083 B2 1/2021 Moeller-Bertram et al.
10,887,433 B2 1/2021 Fu et al.
10,890,898 B2 1/2021 Akella et al.
10,891,715 B2 1/2021 Li
10,891,735 B2 1/2021 Yang et al.
10,893,070 B2 1/2021 Wang et al.
10,893,107 B1 1/2021 Callari et al.
10,896,763 B2 1/2021 Kempanna et al.
10,901,416 B2 1/2021 Khanna et al.
10,901,508 B2 1/2021 Laszlo et al.
10,902,551 B1 1/2021 Mellado Bataller et al.
10,908,068 B2 2/2021 Amer et al.
10,908,606 B2 2/2021 Stein et al.
10,909,368 B2 2/2021 Guo
10,909,453 B1 2/2021 Myers et al.
10,915,783 B1 2/2021 Hallman et al.
10,917,522 B2 2/2021 Segalis et al.
10,921,817 B1 2/2021 Kangaspunta
10,922,578 B2 2/2021 Banerjee et al.
10,924,661 B2 2/2021 Vasconcelos et al.
10,928,508 B2 2/2021 Swaminathan
10,929,757 B2 2/2021 Baker et al.
10,930,065 B2 2/2021 Grant et al.
10,936,908 B1 3/2021 Ho
10,937,186 B2 3/2021 Wang et al.
10,943,101 B2 3/2021 Agarwal et al.
10,943,132 B2 3/2021 Wang et al.
10,943,355 B2 3/2021 Fagg et al.
10,990,826 B1 4/2021 Haider et al.
10,997,461 B2 * 5/2021 Elluswamy .............. G06N 3/08
11,126,180 B1 9/2021 Kobilarov
11,150,664 B2 10/2021 Elluswamy et al.
11,157,287 B2 10/2021 Talpes et al.
11,157,441 B2 10/2021 Talpes et al.
11,256,958 B1 2/2022 Subbiah et al.
11,282,235 B2 3/2022 Torikura et al.
11,292,462 B1 4/2022 Karasev et al.
11,295,180 B1 * 4/2022 Tolstov .................. G06V 20/70
11,409,692 B2 8/2022 Das Sarma et al.
11,430,177 B1 8/2022 Lasram et al.
11,447,142 B1 9/2022 Engstrom et al.
11,501,572 B2 11/2022 Naphade et al.
11,507,836 B1 * 11/2022 Kurz ..................... G06F 18/251
11,615,223 B2 3/2023 Taralova
11,625,041 B2 4/2023 Das et al.
11,921,824 B1 3/2024 Hester et al.
2003/0035481 A1 2/2003 Hahm
2005/0162445 A1 7/2005 Sheasby et al.
2006/0072847 A1 4/2006 Chor et al.
2006/0098843 A1 5/2006 Chew
2006/0224533 A1 10/2006 Thaler
2006/0280364 A1 12/2006 Ma et al.
2009/0016571 A1 1/2009 Tijerina
2010/0118157 A1 5/2010 Ushijima et al.
2010/0121576 A1 5/2010 Aso et al.
2012/0109915 A1 5/2012 Kamekawa
2012/0110491 A1 5/2012 Cheung
2012/0134595 A1 5/2012 Fonseca et al.
2013/0173150 A1 7/2013 Ghisio

(56) References Cited

U.S. PATENT DOCUMENTS

2013/0342692 A1 12/2013 Li et al.
2014/0003709 A1 1/2014 Ranganathan et al.
2014/0093176 A1* 4/2014 Maeda ................ G11B 27/105 382/195
2014/0270362 A1 9/2014 Najafi Shoushtari et al.
2015/0104102 A1 4/2015 Carreira
2016/0003636 A1 1/2016 Ng-Thow-Hing et al.
2016/0132786 A1 5/2016 Balan et al.
2016/0180197 A1 6/2016 Kim et al.
2016/0307071 A1* 10/2016 Perronnin ........... G06F 18/2135
2016/0328856 A1 11/2016 Mannino
2017/0011281 A1 1/2017 Dijkman
2017/0060379 A1 3/2017 Capozella et al.
2017/0132334 A1 5/2017 Levinson et al.
2017/0158134 A1 6/2017 Shigemura
2017/0206434 A1 7/2017 Nariyambut Murali et al.
2018/0012411 A1 1/2018 Richey et al.
2018/0018590 A1 1/2018 Szeto et al.
2018/0039853 A1 2/2018 Liu
2018/0052225 A1 2/2018 Bohme et al.
2018/0067489 A1 3/2018 Oder et al.
2018/0068459 A1 3/2018 Zhang
2018/0068540 A1 3/2018 Romanenko et al.
2018/0074506 A1 3/2018 Branson
2018/0121762 A1 5/2018 Han
2018/0150081 A1 5/2018 Gross et al.
2018/0188027 A1* 7/2018 Zhang .................... G06T 17/05
2018/0189578 A1 7/2018 Yang et al.
2018/0203456 A1 7/2018 Nagasaka et al.
2018/0211403 A1 7/2018 Hotson et al.
2018/0308012 A1 10/2018 Mummadi
2018/0314878 A1 11/2018 Lee et al.
2018/0348346 A1 12/2018 Vallespi-Gonzalez et al.
2018/0349782 A1* 12/2018 Zheng .................... G05D 1/227
2018/0357492 A1 12/2018 Allen et al.
2018/0357511 A1 12/2018 Misra
2018/0373943 A1* 12/2018 Tanigawa ............... G06V 10/25
2018/0374105 A1 12/2018 Azout et al.
2019/0005338 A1 1/2019 Watanabe
2019/0011910 A1 1/2019 Lockwood et al.
2019/0023277 A1 1/2019 Roger
2019/0025773 A1 1/2019 Yang et al.
2019/0026250 A1 1/2019 Das Sarma et al.
2019/0042894 A1 2/2019 Anderson
2019/0042919 A1 2/2019 Peysakhovich et al.
2019/0042944 A1 2/2019 Nair
2019/0042948 A1 2/2019 Lee et al.
2019/0049970 A1 2/2019 Djuric et al.
2019/0057314 A1 2/2019 Julian et al.
2019/0065637 A1 2/2019 Bogdoll et al.
2019/0072978 A1 3/2019 Dan et al.
2019/0079526 A1 3/2019 Vallespi-Gonzalez et al.
2019/0080602 A1 3/2019 Rice et al.
2019/0095780 A1 3/2019 Zhong et al.
2019/0095946 A1 3/2019 Azout et al.
2019/0096256 A1 3/2019 Rowell
2019/0101914 A1 4/2019 Coleman et al.
2019/0108417 A1 4/2019 Talagala et al.
2019/0122111 A1 4/2019 Min
2019/0130255 A1 5/2019 Yim
2019/0145765 A1 5/2019 Luo et al.
2019/0146497 A1 5/2019 Urtasun
2019/0146519 A1 5/2019 Miura et al.
2019/0147112 A1 5/2019 Gordon
2019/0147250 A1 5/2019 Zhang et al.
2019/0147254 A1 5/2019 Bai et al.
2019/0147255 A1 5/2019 Homayounfar et al.
2019/0147335 A1 5/2019 Wang et al.
2019/0147372 A1 5/2019 Luo et al.
2019/0156485 A1 5/2019 Pfeiffer
2019/0158784 A1 5/2019 Ahn et al.
2019/0180154 A1 6/2019 Orlov et al.
2019/0185010 A1 6/2019 Ganguli et al.
2019/0189251 A1 6/2019 Horiuchi et al.
2019/0197357 A1 6/2019 Anderson et al.
2019/0204842 A1 7/2019 Jafari Tafti et al.
2019/0205402 A1 7/2019 Sernau et al.
2019/0205667 A1 7/2019 Avidan et al.
2019/0217791 A1 7/2019 Bradley et al.
2019/0227562 A1 7/2019 Mohammadiha et al.
2019/0228037 A1 7/2019 Nicol et al.
2019/0230282 A1 7/2019 Sypitkowski et al.
2019/0232955 A1 8/2019 Grimm et al.
2019/0235499 A1 8/2019 Kazemi et al.
2019/0236437 A1 8/2019 Shin et al.
2019/0243371 A1 8/2019 Nister et al.
2019/0244138 A1 8/2019 Bhowmick et al.
2019/0250622 A1 8/2019 Nister et al.
2019/0250626 A1 8/2019 Ghafarianzadeh et al.
2019/0250640 A1 8/2019 O'Flaherty et al.
2019/0251397 A1 8/2019 Tremblay et al.
2019/0258878 A1 8/2019 Koivisto et al.
2019/0266418 A1 8/2019 Xu et al.
2019/0266610 A1 8/2019 Ghatage et al.
2019/0271559 A1 9/2019 Colgate et al.
2019/0272446 A1 9/2019 Kangaspunta et al.
2019/0276041 A1 9/2019 Choi et al.
2019/0279004 A1 9/2019 Kwon
2019/0286652 A1 9/2019 Habbecke et al.
2019/0286972 A1 9/2019 El Husseini et al.
2019/0287028 A1 9/2019 St. Amant et al.
2019/0289281 A1 9/2019 Badrinarayanan et al.
2019/0294177 A1 9/2019 Kwon
2019/0294975 A1 9/2019 Sachs
2019/0303759 A1 10/2019 Farabet et al.
2019/0310651 A1* 10/2019 Vallespi-Gonzalez ....................... B60W 60/0015
2019/0311290 A1 10/2019 Huang et al.
2019/0318099 A1 10/2019 Carvalho et al.
2019/0325088 A1 10/2019 Dubey et al.
2019/0325266 A1 10/2019 Klepper et al.
2019/0325269 A1 10/2019 Bagherinezhad et al.
2019/0325580 A1 10/2019 Lukac et al.
2019/0325595 A1 10/2019 Stein et al.
2019/0329790 A1 10/2019 Nandakumar
2019/0332875 A1 10/2019 Vallespi-Gonzalez et al.
2019/0333232 A1 10/2019 Vallespi-Gonzalez et al.
2019/0336063 A1 11/2019 Dascalu
2019/0339989 A1 11/2019 Liang et al.
2019/0340462 A1 11/2019 Pao et al.
2019/0340492 A1 11/2019 Burger et al.
2019/0340499 A1 11/2019 Burger et al.
2019/0347501 A1 11/2019 Kim et al.
2019/0349571 A1 11/2019 Herman et al.
2019/0354782 A1 11/2019 Kee et al.
2019/0354786 A1 11/2019 Lee et al.
2019/0354808 A1 11/2019 Park et al.
2019/0354817 A1 11/2019 Shlens et al.
2019/0354850 A1 11/2019 Watson et al.
2019/0367021 A1 12/2019 Zhao et al.
2019/0367022 A1 12/2019 Zhao et al.
2019/0369616 A1 12/2019 Ostafew
2019/0369626 A1 12/2019 Lui et al.
2019/0370398 A1 12/2019 He et al.
2019/0370575 A1 12/2019 Nandakumar et al.
2019/0370935 A1 12/2019 Chang et al.
2019/0373322 A1 12/2019 Rojas-Echenique et al.
2019/0377345 A1 12/2019 Bachrach et al.
2019/0377965 A1 12/2019 Totolos, Jr. et al.
2019/0378049 A1 12/2019 Widmann et al.
2019/0378051 A1 12/2019 Widmann et al.
2019/0382007 A1 12/2019 Casas et al.
2019/0384303 A1 12/2019 Muller et al.
2019/0384304 A1 12/2019 Towal et al.
2019/0384309 A1 12/2019 Silva et al.
2019/0384994 A1 12/2019 Frossard et al.
2019/0385048 A1 12/2019 Cassidy et al.
2019/0385360 A1 12/2019 Yang et al.
2020/0000057 A1 1/2020 Niemela et al.
2020/0004259 A1 1/2020 Gulino et al.
2020/0004351 A1 1/2020 Marchant et al.
2020/0012936 A1 1/2020 Lee et al.
2020/0017117 A1 1/2020 Milton
2020/0023836 A1 1/2020 Schneider et al.

(56) References Cited

U.S. PATENT DOCUMENTS

| | | | |
|---|---|---|---|
| 2020/0025931 | A1 | 1/2020 | Liang et al. |
| 2020/0026282 | A1 | 1/2020 | Choe et al. |
| 2020/0026283 | A1 | 1/2020 | Barnes et al. |
| 2020/0026992 | A1 | 1/2020 | Zhang et al. |
| 2020/0027210 | A1 | 1/2020 | Haemel et al. |
| 2020/0033858 | A1 | 1/2020 | Xiao et al. |
| 2020/0033865 | A1 | 1/2020 | Mellinger, III |
| 2020/0034665 | A1 | 1/2020 | Ghanta et al. |
| 2020/0034710 | A1 | 1/2020 | Sidhu et al. |
| 2020/0036948 | A1 | 1/2020 | Song |
| 2020/0039520 | A1 | 2/2020 | Misu |
| 2020/0051550 | A1 | 2/2020 | Baker |
| 2020/0057487 | A1 | 2/2020 | Sicconi et al. |
| 2020/0060757 | A1 | 2/2020 | Ben-Haim |
| 2020/0065711 | A1 | 2/2020 | Clément |
| 2020/0065879 | A1 | 2/2020 | Hu |
| 2020/0069973 | A1 | 3/2020 | Lou |
| 2020/0073385 | A1 | 3/2020 | Jobanputra |
| 2020/0074230 | A1 | 3/2020 | Englard |
| 2020/0074266 | A1 | 3/2020 | Peake et al. |
| 2020/0086880 | A1 | 3/2020 | Poeppel |
| 2020/0089243 | A1 | 3/2020 | Poeppel |
| 2020/0089246 | A1 | 3/2020 | Mcgill et al. |
| 2020/0089969 | A1 | 3/2020 | Lakshmi Narayanan |
| 2020/0090056 | A1 | 3/2020 | Singhal |
| 2020/0097841 | A1 | 3/2020 | Ioannis et al. |
| 2020/0098095 | A1 | 3/2020 | Borcs et al. |
| 2020/0103894 | A1 | 4/2020 | Cella et al. |
| 2020/0104705 | A1 | 4/2020 | Bhowmick et al. |
| 2020/0104753 | A1* | 4/2020 | Demiralp ................ G06F 30/20 |
| 2020/0110416 | A1 | 4/2020 | Hong et al. |
| 2020/0117180 | A1 | 4/2020 | Cella |
| 2020/0117889 | A1 | 4/2020 | Laput |
| 2020/0117916 | A1 | 4/2020 | Liu |
| 2020/0117917 | A1 | 4/2020 | Yoo |
| 2020/0118035 | A1 | 4/2020 | Asawa |
| 2020/0118294 | A1 | 4/2020 | Nakao et al. |
| 2020/0125112 | A1 | 4/2020 | Mao et al. |
| 2020/0125844 | A1 | 4/2020 | She |
| 2020/0125845 | A1 | 4/2020 | Hess |
| 2020/0126129 | A1 | 4/2020 | Lkhamsuren |
| 2020/0126192 | A1 | 4/2020 | Munkberg et al. |
| 2020/0134379 | A1* | 4/2020 | Gaidon ................ G06N 3/0895 |
| 2020/0134427 | A1 | 4/2020 | Oh et al. |
| 2020/0134461 | A1 | 4/2020 | Chai et al. |
| 2020/0134466 | A1 | 4/2020 | Weintraub et al. |
| 2020/0134848 | A1 | 4/2020 | El-Khamy et al. |
| 2020/0143231 | A1 | 5/2020 | Fusi et al. |
| 2020/0143279 | A1 | 5/2020 | West et al. |
| 2020/0148201 | A1 | 5/2020 | King et al. |
| 2020/0149898 | A1 | 5/2020 | Felip Leon et al. |
| 2020/0151201 | A1 | 5/2020 | Chandrasekhar et al. |
| 2020/0151619 | A1 | 5/2020 | Mopur et al. |
| 2020/0151692 | A1 | 5/2020 | Gao et al. |
| 2020/0158822 | A1 | 5/2020 | Owens et al. |
| 2020/0158869 | A1 | 5/2020 | Amirloo Abolfathi et al. |
| 2020/0159225 | A1 | 5/2020 | Zeng et al. |
| 2020/0160064 | A1 | 5/2020 | Wang et al. |
| 2020/0160104 | A1 | 5/2020 | Urtasun et al. |
| 2020/0160117 | A1 | 5/2020 | Urtasun et al. |
| 2020/0160178 | A1 | 5/2020 | Kar et al. |
| 2020/0160532 | A1 | 5/2020 | Urtasun et al. |
| 2020/0160558 | A1 | 5/2020 | Urtasun et al. |
| 2020/0160559 | A1 | 5/2020 | Urtasun et al. |
| 2020/0160598 | A1 | 5/2020 | Manivasagam et al. |
| 2020/0162489 | A1 | 5/2020 | Bar-Nahum et al. |
| 2020/0167438 | A1 | 5/2020 | Herring |
| 2020/0167554 | A1 | 5/2020 | Wang et al. |
| 2020/0174481 | A1 | 6/2020 | Van Heukelom et al. |
| 2020/0175326 | A1 | 6/2020 | Shen et al. |
| 2020/0175354 | A1 | 6/2020 | Volodarskiy et al. |
| 2020/0175371 | A1 | 6/2020 | Kursun |
| 2020/0175401 | A1 | 6/2020 | Shen |
| 2020/0183482 | A1 | 6/2020 | Sebot et al. |
| 2020/0184250 | A1 | 6/2020 | Oko |
| 2020/0184333 | A1 | 6/2020 | Oh |
| 2020/0192389 | A1 | 6/2020 | Remine et al. |
| 2020/0193313 | A1 | 6/2020 | Ghanta et al. |
| 2020/0193328 | A1 | 6/2020 | Guestrin et al. |
| 2020/0202136 | A1 | 6/2020 | Shrestha et al. |
| 2020/0202196 | A1 | 6/2020 | Guo et al. |
| 2020/0209857 | A1 | 7/2020 | Djuric et al. |
| 2020/0209867 | A1 | 7/2020 | Valois et al. |
| 2020/0209874 | A1 | 7/2020 | Chen et al. |
| 2020/0210717 | A1 | 7/2020 | Hou et al. |
| 2020/0210726 | A1 | 7/2020 | Yang et al. |
| 2020/0210769 | A1 | 7/2020 | Hou et al. |
| 2020/0210777 | A1 | 7/2020 | Valois et al. |
| 2020/0216064 | A1 | 7/2020 | Du Toit et al. |
| 2020/0218722 | A1 | 7/2020 | Mai et al. |
| 2020/0218910 | A1 | 7/2020 | Herman |
| 2020/0218979 | A1 | 7/2020 | Kwon et al. |
| 2020/0223434 | A1 | 7/2020 | Campos Macias et al. |
| 2020/0225758 | A1 | 7/2020 | Tang et al. |
| 2020/0226377 | A1 | 7/2020 | Campos Macias et al. |
| 2020/0226430 | A1 | 7/2020 | Ahuja et al. |
| 2020/0238998 | A1 | 7/2020 | Dasalukunte et al. |
| 2020/0242381 | A1 | 7/2020 | Chao et al. |
| 2020/0242408 | A1 | 7/2020 | Kim et al. |
| 2020/0242479 | A1 | 7/2020 | Kim et al. |
| 2020/0242511 | A1 | 7/2020 | Kale et al. |
| 2020/0245654 | A1 | 8/2020 | Zhu et al. |
| 2020/0245869 | A1 | 8/2020 | Sivan et al. |
| 2020/0249685 | A1* | 8/2020 | Elluswamy .......... G05D 1/0214 |
| 2020/0250456 | A1 | 8/2020 | Wang et al. |
| 2020/0250473 | A1* | 8/2020 | Elluswamy .............. G06N 3/08 |
| 2020/0250515 | A1 | 8/2020 | Rifkin et al. |
| 2020/0250874 | A1 | 8/2020 | Assouline et al. |
| 2020/0257301 | A1 | 8/2020 | Weiser |
| 2020/0257306 | A1 | 8/2020 | Nisenzon |
| 2020/0258057 | A1 | 8/2020 | Farahat et al. |
| 2020/0258380 | A1 | 8/2020 | Wissing et al. |
| 2020/0265247 | A1 | 8/2020 | Musk et al. |
| 2020/0272160 | A1 | 8/2020 | Djuric et al. |
| 2020/0272162 | A1 | 8/2020 | Hasselgren et al. |
| 2020/0272859 | A1 | 8/2020 | Iashyn et al. |
| 2020/0273231 | A1 | 8/2020 | Schied et al. |
| 2020/0279354 | A1 | 9/2020 | Klaiman |
| 2020/0279364 | A1 | 9/2020 | Sarkisian et al. |
| 2020/0279371 | A1 | 9/2020 | Wenzel et al. |
| 2020/0285464 | A1 | 9/2020 | Brebner |
| 2020/0286256 | A1 | 9/2020 | Houts et al. |
| 2020/0293786 | A1 | 9/2020 | Jia et al. |
| 2020/0293796 | A1 | 9/2020 | Sajjadi Mohammadabadi et al. |
| 2020/0293828 | A1 | 9/2020 | Wang et al. |
| 2020/0293905 | A1 | 9/2020 | Huang et al. |
| 2020/0294162 | A1 | 9/2020 | Shah |
| 2020/0294257 | A1 | 9/2020 | Yoo et al. |
| 2020/0294310 | A1 | 9/2020 | Lee et al. |
| 2020/0297237 | A1 | 9/2020 | Tamersoy et al. |
| 2020/0298891 | A1 | 9/2020 | Liang et al. |
| 2020/0301799 | A1 | 9/2020 | Manivasagam et al. |
| 2020/0302276 | A1 | 9/2020 | Yang et al. |
| 2020/0302291 | A1 | 9/2020 | Hong |
| 2020/0302627 | A1 | 9/2020 | Duggal et al. |
| 2020/0302662 | A1 | 9/2020 | Homayounfar et al. |
| 2020/0304441 | A1 | 9/2020 | Bradley et al. |
| 2020/0306640 | A1 | 10/2020 | Kolen et al. |
| 2020/0307562 | A1 | 10/2020 | Ghafarianzadeh et al. |
| 2020/0307563 | A1 | 10/2020 | Ghafarianzadeh et al. |
| 2020/0307578 | A1 | 10/2020 | Magolan et al. |
| 2020/0309536 | A1 | 10/2020 | Omari et al. |
| 2020/0309923 | A1 | 10/2020 | Bhaskaran et al. |
| 2020/0310442 | A1 | 10/2020 | Halder et al. |
| 2020/0311601 | A1 | 10/2020 | Robinson et al. |
| 2020/0312003 | A1 | 10/2020 | Borovikov |
| 2020/0315708 | A1 | 10/2020 | Mosnier |
| 2020/0320132 | A1 | 10/2020 | Neumann |
| 2020/0324073 | A1 | 10/2020 | Rajan Kesavelu Shekar et al. |
| 2020/0327192 | A1 | 10/2020 | Hackman et al. |
| 2020/0327443 | A1 | 10/2020 | Van Vredendaal et al. |
| 2020/0327449 | A1 | 10/2020 | Tiwari et al. |
| 2020/0327662 | A1 | 10/2020 | Liu et al. |
| 2020/0327667 | A1 | 10/2020 | Arbel |

(56) References Cited

U.S. PATENT DOCUMENTS

| | | | |
|---|---|---|---|
| 2020/0331476 | A1 | 10/2020 | Chen et al. |
| 2020/0334416 | A1 | 10/2020 | Vianu et al. |
| 2020/0334495 | A1 | 10/2020 | Al-Rfou et al. |
| 2020/0334501 | A1 | 10/2020 | Lin et al. |
| 2020/0334551 | A1 | 10/2020 | Javidi |
| 2020/0334574 | A1 | 10/2020 | Ishida |
| 2020/0337648 | A1 | 10/2020 | Saripalli et al. |
| 2020/0339109 | A1 | 10/2020 | Hong et al. |
| 2020/0341466 | A1 | 10/2020 | Pham et al. |
| 2020/0342350 | A1 | 10/2020 | Madar et al. |
| 2020/0342548 | A1 | 10/2020 | Mazed et al. |
| 2020/0342652 | A1 | 10/2020 | Rowell et al. |
| 2020/0348909 | A1 | 11/2020 | Das Sarma et al. |
| 2020/0350063 | A1 | 11/2020 | Thornton et al. |
| 2020/0351438 | A1 | 11/2020 | Dewhurst et al. |
| 2020/0356107 | A1 | 11/2020 | Wells |
| 2020/0356790 | A1 | 11/2020 | Jaipuria et al. |
| 2020/0356864 | A1 | 11/2020 | Neumann |
| 2020/0356905 | A1 | 11/2020 | Luk |
| 2020/0361083 | A1 | 11/2020 | Mousavian et al. |
| 2020/0361452 | A1 | 11/2020 | Mcgill et al. |
| 2020/0361485 | A1 | 11/2020 | Zhu et al. |
| 2020/0364481 | A1 | 11/2020 | Kornienko et al. |
| 2020/0364508 | A1 | 11/2020 | Gurel et al. |
| 2020/0364540 | A1 | 11/2020 | Elsayed et al. |
| 2020/0364746 | A1 | 11/2020 | Longano |
| 2020/0364953 | A1 | 11/2020 | Simoudis |
| 2020/0372362 | A1 | 11/2020 | Kim |
| 2020/0372402 | A1 | 11/2020 | Kursun et al. |
| 2020/0380362 | A1 | 12/2020 | Cao et al. |
| 2020/0380383 | A1 | 12/2020 | Kwong et al. |
| 2020/0393841 | A1 | 12/2020 | Frisbie et al. |
| 2020/0394421 | A1 | 12/2020 | Yu et al. |
| 2020/0394457 | A1 | 12/2020 | Brady |
| 2020/0394495 | A1 | 12/2020 | Moudgill et al. |
| 2020/0394813 | A1 | 12/2020 | Theverapperuma et al. |
| 2020/0394911 | A1 | 12/2020 | Harmel et al. |
| 2020/0396394 | A1 | 12/2020 | Zlokolica et al. |
| 2020/0398855 | A1 | 12/2020 | Thompson |
| 2020/0401850 | A1 | 12/2020 | Bazarsky et al. |
| 2020/0401886 | A1 | 12/2020 | Deng et al. |
| 2020/0402155 | A1 | 12/2020 | Kurian et al. |
| 2020/0402226 | A1 | 12/2020 | Peng |
| 2020/0409364 | A1 | 12/2020 | Agrawal |
| 2020/0410012 | A1 | 12/2020 | Moon et al. |
| 2020/0410224 | A1 | 12/2020 | Goel |
| 2020/0410254 | A1 | 12/2020 | Pham et al. |
| 2020/0410288 | A1 | 12/2020 | Capota et al. |
| 2020/0410751 | A1 | 12/2020 | Omari et al. |
| 2020/0410853 | A1 | 12/2020 | Akella et al. |
| 2021/0004014 | A1 | 1/2021 | Sivakumar |
| 2021/0004580 | A1 | 1/2021 | Sundararaman et al. |
| 2021/0004611 | A1 | 1/2021 | Garimella et al. |
| 2021/0004663 | A1 | 1/2021 | Park et al. |
| 2021/0006835 | A1 | 1/2021 | Slattery et al. |
| 2021/0011908 | A1 | 1/2021 | Hayes et al. |
| 2021/0012116 | A1 | 1/2021 | Urtasun et al. |
| 2021/0012210 | A1 | 1/2021 | Sikka et al. |
| 2021/0012230 | A1 | 1/2021 | Hayes et al. |
| 2021/0012239 | A1 | 1/2021 | Arzani et al. |
| 2021/0015240 | A1 | 1/2021 | Elfakhri et al. |
| 2021/0019215 | A1 | 1/2021 | Neeter |
| 2021/0026360 | A1 | 1/2021 | Luo |
| 2021/0027112 | A1 | 1/2021 | Brewington et al. |
| 2021/0027117 | A1 | 1/2021 | Mcgavran et al. |
| 2021/0027657 | A1 | 1/2021 | Becker |
| 2021/0030276 | A1 | 2/2021 | Li et al. |
| 2021/0031758 | A1 | 2/2021 | Urano et al. |
| 2021/0031759 | A1 | 2/2021 | Urano et al. |
| 2021/0031760 | A1 | 2/2021 | Ostafew et al. |
| 2021/0034921 | A1 | 2/2021 | Pinkovich et al. |
| 2021/0035442 | A1 | 2/2021 | Baig et al. |
| 2021/0035447 | A1 | 2/2021 | Urano et al. |
| 2021/0042575 | A1 | 2/2021 | Firner |
| 2021/0042928 | A1 | 2/2021 | Takeda et al. |
| 2021/0046954 | A1 | 2/2021 | Haynes |
| 2021/0049378 | A1 | 2/2021 | Gautam et al. |
| 2021/0049455 | A1 | 2/2021 | Kursun |
| 2021/0049456 | A1 | 2/2021 | Kursun |
| 2021/0049548 | A1 | 2/2021 | Grisz et al. |
| 2021/0049700 | A1 | 2/2021 | Nguyen et al. |
| 2021/0053570 | A1 | 2/2021 | Akella et al. |
| 2021/0056114 | A1 | 2/2021 | Price et al. |
| 2021/0056306 | A1 | 2/2021 | Hu et al. |
| 2021/0056317 | A1 | 2/2021 | Golov |
| 2021/0056420 | A1 | 2/2021 | Konishi et al. |
| 2021/0056701 | A1 | 2/2021 | Vranceanu et al. |
| 2021/0094558 | A1 | 4/2021 | Garcia et al. |
| 2021/0125057 | A1* | 4/2021 | Choi ........................ G06N 3/04 |
| 2021/0150244 | A1* | 5/2021 | Segal ................ G06F 16/90332 |
| 2021/0163031 | A1 | 6/2021 | Jagbrant et al. |
| 2021/0201145 | A1 | 7/2021 | Pham et al. |
| 2021/0224537 | A1* | 7/2021 | Inoshita ............... G06N 3/0464 |
| 2021/0232824 | A1* | 7/2021 | Shayne .................. G06V 20/40 |
| 2021/0233390 | A1 | 7/2021 | Georgiou et al. |
| 2021/0237769 | A1 | 8/2021 | Ostafew |
| 2021/0248490 | A1* | 8/2021 | Ma ........................ G06F 3/0487 |
| 2021/0263157 | A1 | 8/2021 | Zhu |
| 2021/0271259 | A1 | 9/2021 | Karpathy |
| 2021/0271898 | A1* | 9/2021 | Chen ........................ G06N 3/02 |
| 2021/0276574 | A1 | 9/2021 | Efrat Sela et al. |
| 2021/0302992 | A1 | 9/2021 | Chen et al. |
| 2021/0303922 | A1 | 9/2021 | Tu et al. |
| 2021/0342609 | A1 | 11/2021 | Smolyanskiy et al. |
| 2021/0347377 | A1 | 11/2021 | Siebert et al. |
| 2021/0347383 | A1 | 11/2021 | Siebert et al. |
| 2021/0358137 | A1 | 11/2021 | Lee et al. |
| 2021/0380099 | A1 | 12/2021 | Lee et al. |
| 2021/0406560 | A1 | 12/2021 | Park et al. |
| 2022/0044034 | A1* | 2/2022 | RoyChowdhury .......................... B60G 17/0165 |
| 2022/0083785 | A1 | 3/2022 | Subramanian et al. |
| 2022/0092349 | A1 | 3/2022 | Yang |
| 2022/0105947 | A1* | 4/2022 | Postnikov ........... B60W 40/076 |
| 2022/0153263 | A1 | 5/2022 | Hotta et al. |
| 2022/0156525 | A1 | 5/2022 | Guizilini et al. |
| 2022/0185625 | A1 | 6/2022 | One |
| 2022/0227367 | A1 | 7/2022 | Kario et al. |
| 2022/0242441 | A1 | 8/2022 | Thompson et al. |
| 2022/0299656 | A1 | 9/2022 | Cui et al. |
| 2022/0383741 | A1 | 12/2022 | Sanchez |
| 2022/0402485 | A1 | 12/2022 | Kobilarov et al. |
| 2023/0053785 | A1 | 2/2023 | Carvalho et al. |
| 2023/0057509 | A1 | 2/2023 | Emmons et al. |
| 2023/0085938 | A1 | 3/2023 | He et al. |
| 2023/0110027 | A1 | 4/2023 | Bajpayee et al. |
| 2023/0267720 | A1 | 8/2023 | Marvasti et al. |
| 2023/0326215 | A1 | 10/2023 | Yu et al. |
| 2024/0083419 | A1 | 3/2024 | Haruta et al. |
| 2024/0160194 | A1 | 5/2024 | Bakhshmand et al. |
| 2024/0174264 | A1 | 5/2024 | Wray et al. |
| 2024/0317267 | A1 | 9/2024 | Bergquist et al. |
| 2024/0353231 | A1 | 10/2024 | Burlina et al. |
| 2024/0355132 | A1 | 10/2024 | Duan et al. |
| 2024/0378896 | A1 | 11/2024 | Vasudevan et al. |
| 2025/0162612 | A1 | 5/2025 | Woelki et al. |
| 2025/0171016 | A1 | 5/2025 | Garimella et al. |
| 2025/0242803 | A1 | 7/2025 | Brown et al. |

FOREIGN PATENT DOCUMENTS

| | | | |
|---|---|---|---|
| CN | 102737236 | A | 10/2012 |
| CN | 103366339 | A | 10/2013 |
| CN | 104835114 | A | 8/2015 |
| CN | 103236037 | B | 5/2016 |
| CN | 103500322 | B | 8/2016 |
| CN | 106419893 | A | 2/2017 |
| CN | 106504253 | A | 3/2017 |
| CN | 107031600 | A | 8/2017 |
| CN | 107169421 | A | 9/2017 |
| CN | 107507134 | A | 12/2017 |
| CN | 107885214 | A | 4/2018 |
| CN | 108122234 | A | 6/2018 |
| CN | 107133943 | B | 7/2018 |

(56) References Cited

FOREIGN PATENT DOCUMENTS

| | | | | |
|---|---|---|---|---|
| CN | 107368926 B | | 7/2018 | |
| CN | 105318888 B | | 8/2018 | |
| CN | 108491889 A | | 9/2018 | |
| CN | 108647591 A | | 10/2018 | |
| CN | 108710865 A | | 10/2018 | |
| CN | 105550701 B | | 11/2018 | |
| CN | 108764185 A | | 11/2018 | |
| CN | 108845574 A | | 11/2018 | |
| CN | 108898177 A | | 11/2018 | |
| CN | 109086867 A | | 12/2018 | |
| CN | 107103113 B | | 1/2019 | |
| CN | 109215067 A | | 1/2019 | |
| CN | 109359731 A | | 2/2019 | |
| CN | 109389207 A | | 2/2019 | |
| CN | 109389552 A | | 2/2019 | |
| CN | 106779060 B | | 3/2019 | |
| CN | 109579856 A | | 4/2019 | |
| CN | 109615073 A | | 4/2019 | |
| CN | 106156754 B | | 5/2019 | |
| CN | 106598226 B | | 5/2019 | |
| CN | 106650922 B | | 5/2019 | |
| CN | 109791626 A | | 5/2019 | |
| CN | 109901595 A | | 6/2019 | |
| CN | 109902732 A | | 6/2019 | |
| CN | 109934163 A | | 6/2019 | |
| CN | 109948428 A | | 6/2019 | |
| CN | 109949257 A | | 6/2019 | |
| CN | 109951710 A | | 6/2019 | |
| CN | 109975308 A | | 7/2019 | |
| CN | 109978132 A | | 7/2019 | |
| CN | 109978161 A | | 7/2019 | |
| CN | 110060202 A | | 7/2019 | |
| CN | 110069071 A | | 7/2019 | |
| CN | 110084086 A | | 8/2019 | |
| CN | 110096937 A | | 8/2019 | |
| CN | 110111340 A | | 8/2019 | |
| CN | 110135485 A | | 8/2019 | |
| CN | 110197270 B | | 9/2019 | |
| CN | 110310264 A | | 10/2019 | |
| CN | 110321965 A | | 10/2019 | |
| CN | 110334801 A | | 10/2019 | |
| CN | 110399875 A | | 11/2019 | |
| CN | 110414362 A | | 11/2019 | |
| CN | 110426051 A | | 11/2019 | |
| CN | 110473173 A | | 11/2019 | |
| CN | 110516665 A | | 11/2019 | |
| CN | 110543837 A | | 12/2019 | |
| CN | 110569899 A | | 12/2019 | |
| CN | 110599537 A | | 12/2019 | |
| CN | 110599864 A | | 12/2019 | |
| CN | 110619282 A | | 12/2019 | |
| CN | 110619283 A | | 12/2019 | |
| CN | 110619330 A | | 12/2019 | |
| CN | 110659628 A | | 1/2020 | |
| CN | 110688992 A | | 1/2020 | |
| CN | 107742311 B | | 2/2020 | |
| CN | 110751280 A | | 2/2020 | |
| CN | 110826566 A | | 2/2020 | |
| CN | 110909587 A | * | 3/2020 | ............ G06T 7/174 |
| CN | 107451659 B | | 4/2020 | |
| CN | 108111873 B | | 4/2020 | |
| CN | 110954111 A | * | 4/2020 | ........ B60W 50/0225 |
| CN | 110956185 A | | 4/2020 | |
| CN | 110966991 A | | 4/2020 | |
| CN | 111027549 A | | 4/2020 | |
| CN | 111027575 A | | 4/2020 | |
| CN | 111047225 A | | 4/2020 | |
| CN | 111126453 A | | 5/2020 | |
| CN | 111158355 A | | 5/2020 | |
| CN | 107729998 B | | 6/2020 | |
| CN | 108549934 B | | 6/2020 | |
| CN | 111275129 A | | 6/2020 | |
| CN | 111275618 A | | 6/2020 | |
| CN | 111307162 B | | 6/2020 | |
| CN | 111326023 A | | 6/2020 | |
| CN | 111428943 A | | 7/2020 | |
| CN | 111444821 A | | 7/2020 | |
| CN | 111445420 A | | 7/2020 | |
| CN | 111461052 A | | 7/2020 | |
| CN | 111461053 A | | 7/2020 | |
| CN | 111461110 A | | 7/2020 | |
| CN | 110225341 B | | 8/2020 | |
| CN | 111488770 A | | 8/2020 | |
| CN | 111539514 A | | 8/2020 | |
| CN | 111565318 A | | 8/2020 | |
| CN | 111582216 A | | 8/2020 | |
| CN | 111598095 A | | 8/2020 | |
| CN | 108229526 B | | 9/2020 | |
| CN | 111693972 A | | 9/2020 | |
| CN | 106558058 B | | 10/2020 | |
| CN | 107169560 B | | 10/2020 | |
| CN | 107622258 B | | 10/2020 | |
| CN | 111767801 A | | 10/2020 | |
| CN | 111768002 A | | 10/2020 | |
| CN | 111783545 A | | 10/2020 | |
| CN | 111783971 A | | 10/2020 | |
| CN | 111797657 A | | 10/2020 | |
| CN | 111814623 A | | 10/2020 | |
| CN | 111814902 A | | 10/2020 | |
| CN | 111860499 A | | 10/2020 | |
| CN | 111881856 A | | 11/2020 | |
| CN | 111882579 A | | 11/2020 | |
| CN | 111897639 A | | 11/2020 | |
| CN | 111898507 A | | 11/2020 | |
| CN | 111898523 A | | 11/2020 | |
| CN | 111899227 A | | 11/2020 | |
| CN | 112101175 A | | 12/2020 | |
| CN | 112101562 A | | 12/2020 | |
| CN | 112115953 A | | 12/2020 | |
| CN | 111062973 B | | 1/2021 | |
| CN | 111275080 B | | 1/2021 | |
| CN | 112183739 A | | 1/2021 | |
| CN | 112232497 A | | 1/2021 | |
| CN | 112288658 A | | 1/2021 | |
| CN | 112308095 A1 | | 2/2021 | |
| CN | 112308799 A | | 2/2021 | |
| CN | 112313663 A | | 2/2021 | |
| CN | 112329552 A | | 2/2021 | |
| CN | 112348783 A | | 2/2021 | |
| CN | 111899245 B | | 3/2021 | |
| DE | 20 2017 102 235 U1 | | 5/2017 | |
| DE | 20 2017 102 238 U1 | | 5/2017 | |
| DE | 10 2017 116 017 A1 | | 1/2019 | |
| DE | 10 2018 130 821 A1 | | 6/2020 | |
| DE | 102020003008 A1 | * | 7/2020 | ............ G06V 20/58 |
| DE | 10 2019 008 316 A1 | | 8/2020 | |
| DE | 102020130668 A1 | * | 5/2021 | ............ G07C 5/008 |
| EP | 1 215 626 B1 | | 9/2008 | |
| EP | 2 228 666 B1 | | 9/2012 | |
| EP | 2 420 408 B1 | | 5/2013 | |
| EP | 2 723 069 A1 | | 4/2014 | |
| EP | 2 741 253 A1 | | 6/2014 | |
| EP | 3 115 772 A1 | | 1/2017 | |
| EP | 2 618 559 B1 | | 8/2017 | |
| EP | 3 285 485 A1 | | 2/2018 | |
| EP | 2 863 633 B1 | | 2/2019 | |
| EP | 3 113 080 B1 | | 5/2019 | |
| EP | 3 525 132 A1 | | 8/2019 | |
| EP | 3 531 689 A1 | | 8/2019 | |
| EP | 3 537 340 A1 | | 9/2019 | |
| EP | 3 543 917 A1 | | 9/2019 | |
| EP | 3 608 840 A1 | | 2/2020 | |
| EP | 3 657 387 A1 | | 5/2020 | |
| EP | 2 396 750 B1 | | 6/2020 | |
| EP | 3 664 020 A1 | | 6/2020 | |
| EP | 3 690 712 A1 | | 8/2020 | |
| EP | 3 690 730 A2 | | 8/2020 | |
| EP | 3 690 742 A1 | | 8/2020 | |
| EP | 3 722 992 A1 | | 10/2020 | |
| EP | 3 739 486 A1 | | 11/2020 | |
| EP | 3 501 897 B1 | | 12/2020 | |
| EP | 3 751 455 A2 | | 12/2020 | |
| EP | 3 783 527 A1 | | 2/2021 | |
| GB | 2 402 572 B | | 8/2005 | |

(56) References Cited

FOREIGN PATENT DOCUMENTS

| | | | |
|---|---|---|---|
| GB | 2 548 087 | A | 9/2017 |
| GB | 2 577 485 | A | 4/2020 |
| GB | 2 517 270 | B | 6/2020 |
| JP | 2578262 | Y2 | 8/1998 |
| JP | 3941252 | B2 | 7/2007 |
| JP | 4282583 | B2 | 6/2009 |
| JP | 4300098 | B2 | 7/2009 |
| JP | 2015-004922 | A | 1/2015 |
| JP | 5863536 | B2 | 2/2016 |
| JP | 6044134 | B2 | 12/2016 |
| JP | 2017-078904 | A | 4/2017 |
| JP | 2017-151973 | A | 8/2017 |
| JP | 2017-162436 | A | 9/2017 |
| JP | 2019-101535 | A | 6/2019 |
| JP | 6525707 | B2 | 6/2019 |
| JP | 2019-192201 | A | 10/2019 |
| JP | 2020-101927 | A | 7/2020 |
| JP | 2020-173744 | A | 10/2020 |
| KR | 100326702 | B1 | 3/2002 |
| KR | 101082878 | B1 | 11/2011 |
| KR | 101738422 | B1 | 5/2017 |
| KR | 101969864 | B1 | 4/2019 |
| KR | 101996167 | B1 | 7/2019 |
| KR | 102022388 | B1 | 9/2019 |
| KR | 102043143 | B1 | 11/2019 |
| KR | 102095335 | B1 | 3/2020 |
| KR | 102097120 | B1 | 4/2020 |
| KR | 10-2020-0085490 | A | 7/2020 |
| KR | 10-2020-0142266 | A | 12/2020 |
| KR | 102189262 | B1 | 12/2020 |
| TW | 200630819 | A | 9/2006 |
| TW | 1294089 | B | 3/2008 |
| TW | 1306207 | B | 2/2009 |
| WO | WO-02/052835 | A2 | 7/2002 |
| WO | WO-2016/032398 | A2 | 3/2016 |
| WO | WO-2016/048108 | A1 | 3/2016 |
| WO | WO-2016/207875 | A1 | 12/2016 |
| WO | WO-2017/158622 | A2 | 9/2017 |
| WO | WO-2019/005547 | A1 | 1/2019 |
| WO | WO-2019/067695 | A1 | 4/2019 |
| WO | WO-2019/089339 | A1 | 5/2019 |
| WO | WO-2019/089591 | A1 | 5/2019 |
| WO | WO-2019/092456 | A1 | 5/2019 |
| WO | WO-2019/099622 | A1 | 5/2019 |
| WO | WO-2019/122952 | A1 | 6/2019 |
| WO | WO-2019/125191 | A1 | 6/2019 |
| WO | WO-2019/126755 | A1 | 6/2019 |
| WO | WO-2019/144575 | A1 | 8/2019 |
| WO | WO-2019/182782 | A1 | 9/2019 |
| WO | WO-2019/191578 | A1 | 10/2019 |
| WO | WO-2019/216938 | A1 | 11/2019 |
| WO | WO-2019/220436 | A2 | 11/2019 |
| WO | WO-2020/006154 | A2 | 1/2020 |
| WO | WO-2020/012756 | A1 | 1/2020 |
| WO | WO-2020/025696 | A1 | 2/2020 |
| WO | WO-2020/034663 | A1 | 2/2020 |
| WO | WO-2020/056157 | A1 | 3/2020 |
| WO | WO-2020/076356 | A1 | 4/2020 |
| WO | WO-2020/097221 | A1 | 5/2020 |
| WO | WO-2020/101246 | A1 | 5/2020 |
| WO | WO-2020/120050 | A1 | 6/2020 |
| WO | WO-2020/121973 | A1 | 6/2020 |
| WO | WO-2020/131140 | A1 | 6/2020 |
| WO | WO-2020/139181 | A1 | 7/2020 |
| WO | WO-2020/139355 | A1 | 7/2020 |
| WO | WO-2020/139357 | A1 | 7/2020 |
| WO | WO-2020/142193 | A1 | 7/2020 |
| WO | WO-2020/146445 | A1 | 7/2020 |
| WO | WO-2020/151329 | A1 | 7/2020 |
| WO | WO-2020/157761 | A1 | 8/2020 |
| WO | WO-2020/163455 | A1 | 8/2020 |
| WO | WO-2020/167667 | A1 | 8/2020 |
| WO | WO-2020/174262 | A1 | 9/2020 |
| WO | WO-2020/177583 | A1 | 9/2020 |
| WO | WO-2020/185233 | A1 | 9/2020 |
| WO | WO-2020/185234 | A1 | 9/2020 |
| WO | WO-2020/195658 | A1 | 10/2020 |
| WO | WO-2020/198189 | A1 | 10/2020 |
| WO | WO-2020/198779 | A1 | 10/2020 |
| WO | WO-2020/205597 | A1 | 10/2020 |
| WO | WO-2020/221200 | A1 | 11/2020 |
| WO | WO-2020/240284 | A2 | 12/2020 |
| WO | WO-2020/245654 | A1 | 12/2020 |
| WO | WO-2020/260020 | A1 | 12/2020 |
| WO | WO-2020/264010 | A1 | 12/2020 |

OTHER PUBLICATIONS

Ground Truth Data for Object Detection in Autonomous Vehicle from a Driving Simulator, Jubril Gbolahan Adigun et al., 182486IVSM, 2020, pp. V-50 (Year: 2020).*

LabelFusion: A Pipeline for Generating Ground Truth Labels for Real RGBD Data of Cluttered Scenes, Pat Marion et al., arXiv, Sep. 26, 2017, pp. 1-8 (Year: 2017).*

End to End Learning for Self-Driving Cars, Mariusz Bojarski et al., arXiv, 2016, pp. 1-9 (Year: 2016).*

Real-Time Webcam Heart-Rate and Variability Estimation with Clean Ground Truth for Evaluation, AmoghGudi et al., MDPI, 2020, pp. 1-24 (Year: 2020).*

International Preliminary Report on Patentability on PCT/US2022/040784 DTD Feb. 29, 2024 (10 pages).

International Preliminary Report on Patentability on PCT/US2022/040793 DTD Feb. 29, 2024 (10 pages).

International Preliminary Report on Patentability on PCT/US2022/040906 DTD Feb. 29, 2024 (9 pages).

International Search Report and Written Opinion on PCT Appl. No. PCT/US2022/040784 dated Dec. 7, 2022 (15 pages).

International Search Report and Written Opinion on PCT Appl. No. PCT/US2022/040793 dated Nov. 30, 2022 (17 pages).

International Search Report and Written Opinion on PCT Appl. No. PCT/US2022/040906 dated Nov. 18, 2022 (16 pages).

ISR and WO on PCT patent application No. PCT/US2022/040793 dated Oct. 25, 2023 (30 pages).

Chen et al., "Simultaneous End-to-End Vehicle and License Plate Detection with Multi-Branch Attention Neural Network," 2020, IEEE Transactions on Intelligent Transportation Systems, vol. 21, Issue 9, 10 Pages.

Hu et al., "SINet: A Scale-Insensitive Convolutional Neural Network for Fast Vehicle Detection," 2019, IEEE Transactions on Intelligent Transportation Systems, vol. 20, Issue 3, 18 Pages.

Kumar et al., "OmniDet: Surround View Cameras Based Multi-Task Visual Perception Network for Autonomous Driving," 2021, IEEE, Robotics and Automation Letters, vol. 6, Issue 2 (8 Pages).

Li et al., "One-Stage Multi-Sensor Data Fusion Convolutional Neural Network for 3D Object Detection," 2019, 18 Pages.

Duzceker, et al., "DeepVideoMVS: Multi-View Stereo on Video with Recurrent Spatio-Temporal Fusion," arXiv:2012.02177, 16 pages (2021).

Extended European Search Report on EP Appl. No. 26175336.2 dated Jul. 24, 2026 (12 pages).

Notification of Reasons for Refusal for Japanese Patent App. No. 2024-509357 dated Jun. 30, 2026, 9 pages (with English translation).

Abdellatif, et al., "Active Learning With Noisy Labelers for Improving Classification Accuracy of Connected Vehicles," IEEE Transactions on Vehicular Technology 70(4), pp. 3059-3070 (2021).

Extended European Search Report on EPO Patent App. No. 26179580.1 dated Aug. 20, 2026, 11 pages.

Notification of Reasons for Refusal for JP Patent App. No. 2024-509356 dated Aug. 4, 2026, 6 pages (with translation).

Varma, et al., "IDD: A Dataset for Exploring Problems of Autonomous Navigation in Unconstrained Environments," 2019 IEEE Winter Conference on Applications of Computer Vision (WACV), pp. 1743-1751 (2019).

* cited by examiner

VISION-BASED SYSTEM TRAINING WITH SIMULATED CONTENT

CROSS-REFERENCE TO RELATED APPLICATIONS

This application is a U.S. National Stage Application under 35 U.S.C. § 371 of International Patent Application No. PCT/US22/40784, filed Aug. 18, 2022, which claims priority to U.S. Provisional Application No. 63/260,439 entitled ENHANCED SYSTEMS AND METHODS FOR AUTONOMOUS VEHICLE OPERATION AND TRAINING and filed on Aug. 19, 2021, and U.S. Provisional Application No. 63/287,936 entitled ENHANCED SYSTEMS AND METHODS FOR AUTONOMOUS VEHICLE OPERATION AND TRAINING and filed on Dec. 9, 2021, all of which are incorporated herein by reference in their entireties for all purposes.

BACKGROUND

Generally described, computing devices and communication networks can be utilized to exchange data and/or information. In a common application, a computing device can request content from another computing device via the communication network. For example, a computing device can collect various data and utilize a software application to exchange content with a server computing device via the network (e.g., the Internet).

Generally described, a variety of vehicles, such as electric vehicles, combustion engine vehicles, hybrid vehicles, etc., can be configured with various sensors and components to facilitate operation of the vehicle or management of one or more systems include in the vehicle. In certain scenarios, a vehicle owner or vehicle user may wish to utilize sensor-based systems to facilitate in the operation of the vehicle. For example, vehicles can often include hardware and software functionality that facilitates location services or can access computing devices that provide location services. In another example, vehicles can also include navigation systems or access navigation components that can generate information related to navigational or directional information provided to vehicle occupants and users. In still further examples, vehicles can include vision systems to facilitate navigational and location services, safety services or other operational services/components.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
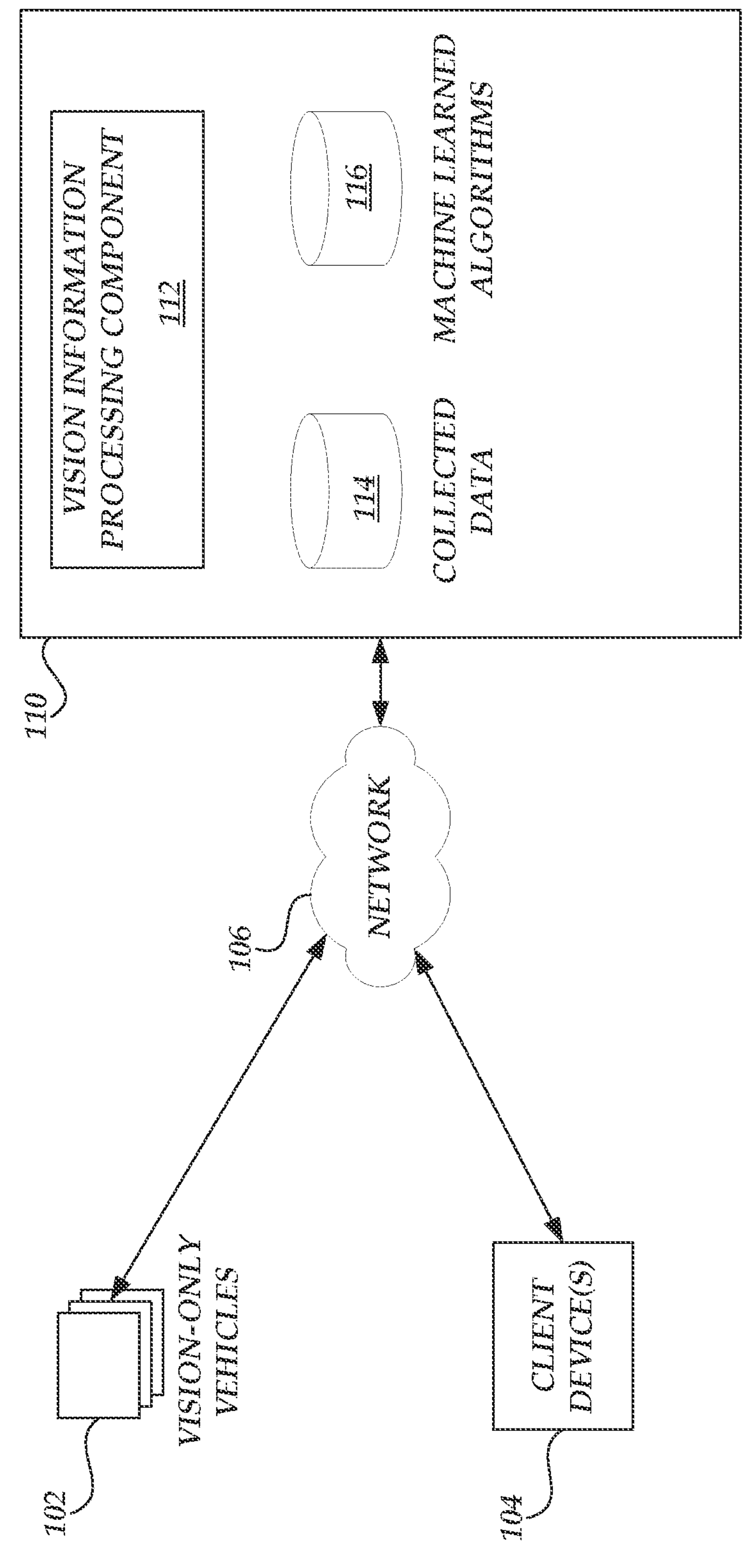
FIG. 1 depicts a block diagram of an illustrative environment for generating simulated content models and training set data for vision systems in vehicles in accordance with one or more aspects of the present application.

Generally described, one or more aspects of the present disclosure relate to the configuration and implementation of vision systems in vehicles. By way of illustrative example, aspects of the present application relate to the configuration and training of machine learned algorithms used in vehicles relying solely on vision systems for various operational functions. More specifically, aspects of the present application relate to the utilization of sets of captured vision system data to facilitate the automated generation of ground truth labels. Illustratively, the vision-only systems are in contrast to vehicles that may combine vision-based systems with one or more additional sensor systems, such as radar-based systems, LIDAR-based systems, SONAR-systems, and the like.

Vision-only systems can be configured with machine learned algorithms that can process inputs solely from vision systems that can include a plurality of cameras mounting on the vehicle. The machine learned algorithm can generate outputs identifying objects and specifying characteristics/attributes of the identified objects, such as position, velocity, acceleration measured relative to the vehicle. The outputs from the machine learned algorithms can be then utilized for further processing, such as for navigational systems, locational systems, safety systems and the like.

In accordance with aspects of the present application, a network service can configure the machine learned algorithm in accordance with a supervised learning model in which a machine learning algorithm is trained with training sets that include captured vision system information and labeled data including identified objects and specified characteristics/attributes, such as position, velocity, acceleration, and the like. Traditional approaches to generation of the training data sets and training of the machine learning algorithms to form the machine learned algorithms often require a manual determination of ground truth labels and associated values for captured vision system information. Such manual approaches are not well suited for larger scale implementation in which the captured vision system data can corresponds to large amounts of individual captured data to be processed. Automated approaches to generating ground truth label data for captured vision system data can be inefficient based on often incomplete or ambiguous image data in each individually captured vision system frame (or set of frames). For example, a particular frame of captured vision system data may have multiple potential interpretations for detected objects and attributes values, such as positioning (e.g., yaw), distance, velocity, etc. Accordingly, some automated systems can include the need for additional sensors/inputs, such as RADAR, LIDAR or other detection systems, to confirm or identify objects and associated attributes/values.

Illustratively, a network service can receive a first set of inputs (e.g., a first data set) from a target vehicle including captured vision system data at a first point in time. The network service then processes at least the ground truth label data associated with the captured vision system data to determine an initial set of ground truth labels and values. The network service can receive a second set of inputs (e.g., a second data set) from the target vehicle including captured vision system data at a second point in time. The second point in time is subsequent to the first point in time. The network service then processes at least the ground truth label data associated with the captured vision system data to determine a second set of ground truth labels and values.

Based on the second set of ground truth labels and values, the network service can then determine labels and associated values for the first set of ground truth labels and values. More specifically, the network service can utilize the known ground truth labels and values resulting of the later point in time to determine or update what the processing of the vision system data of the earlier point of time should have been. For example, ground truth data at the first instance that related multiple potential directional attributes (e.g., yaw rate) would be resolved to the appropriate yaw rate that results in the appropriate end location. In another example, ground truth label values related to positional calculated values for detected objects can be resolved based on determination of positional values in the second point of time.

Illustratively, the generated data sets allows the supplementing of the previously collected ground truth data/vision data with additional information or attribute/characteristics that may not have been otherwise available from originally processing the vision data. The resulting processed content attributes can then form the basis for subsequent generation of training data. The network service can then process the full set of vision data and generated content with data labels. Thereafter, the network service generates an updated machine learned algorithm based on training on the combined data set. The trained machine learned algorithm may be transmitted to vision-only based vehicles.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable with various types of vehicles including vehicles with different of propulsion systems, such as combination engines, hybrid engines, electric engines, and the like. Still further, aspects of the present application may be applicable with various types of vehicles that can incorporate different types of sensors, sensing systems, navigation systems, or location systems. Accordingly, the illustrative examples should not be construed as limiting. Similarly, aspects of the present application may be combined with or implemented with other types of components that may facilitate operation of the vehicle, including autonomous driving applications, driver convenience applications and the like.

FIG. 1 depicts a block diagram of an illustrative environment 100 for generating simulated content models and training set data for vision systems in vehicles in accordance with one or more aspects of the present application. The system 100 can comprise a network, the network connecting a set of vehicles 102, one or more additional client devices 104, and a network service 110. Illustratively, the various aspects associated with the network service 110 can be implemented as one or more components that are associated with one or more functions or services. The components may correspond to software modules implemented or executed by one or more external computing devices, which may be separate stand-alone external computing devices. Accordingly, the components of the network service 110 should be considered as a logical representation of the service, not requiring any specific implementation on one or more external computing devices.

Network 106, as depicted in FIG. 1, connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

Illustratively, the set of vehicles 102 correspond to one or more vehicles configured with vision-only based system for identifying objects and characterizing one or more attributes of the identified objects. The set of vehicles 102 are configured with machine learned algorithms, such as machine learned algorithms implemented a supervised learning model, that are configured to utilize solely vision systems inputs to identify objects and characterize attributes of the identified objects, such as position, velocity and acceleration attributes. The set of vehicles 102 may be configured without any additional detection systems, such as radar detection systems, LIDAR detection systems, and the like.

Illustratively, the network service 110 can include a plurality of network-based services that can provide functionality responsive to configurations/requests for machine learned algorithms for vision-only based systems as applied to aspects of the present application. As illustrated in FIG. 1, the network-based services 110 can include a vision information processing component 112 that can obtain data sets from the vehicles 102 an, process sets of data to form training materials for machine learning algorithm and generate machine learned algorithms for vision-only based vehicles 102. The network-based service can include a plurality of data stores for maintaining various information associated with aspects of the present application, including a vehicle data store 114 and machine learned algorithm data store 116. The data stores in FIG. 1 are logical in nature and can be implemented in the network service 110 in a variety of manners.

Figure 2A:
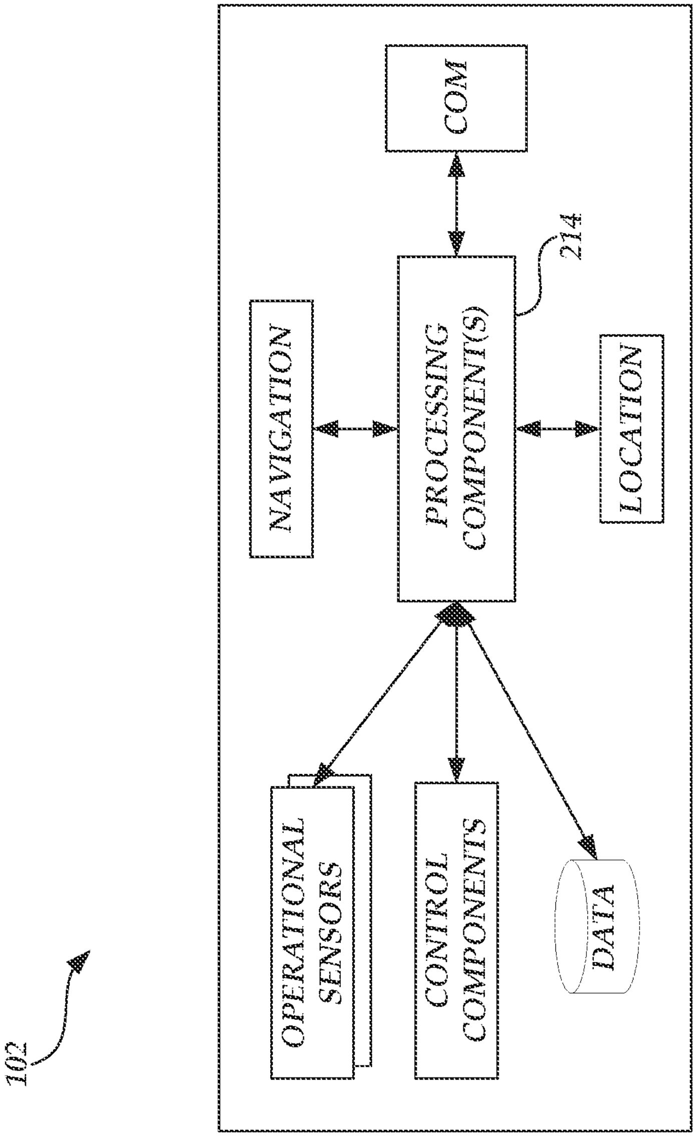
FIG. 2A illustrates an environment that corresponds to vehicles in accordance with one or more aspects of the present application.

For purposes of illustration, FIG. 2A illustrates an environment that corresponds to vehicles 102 in accordance with one or more aspects of the present application. The environment includes a collection of local sensor inputs that can provide inputs for the operation of the vehicle or collection of information as described herein The collection of local sensors can include one or more sensor or sensor-based systems included with a vehicle or otherwise accessible by a vehicle during operation. The local sensors or sensor systems may be integrated into the vehicle. Alternatively, the local sensors or sensor systems may be provided by interfaces associated with a vehicle, such as physical connections, wireless connections, or a combination thereof.

In one aspect, the local sensors can include vision systems that provide inputs to the vehicle, such as detection of objects, attributes of detected objects (e.g., position, velocity, acceleration), presence of environment conditions (e.g., snow, rain, ice, fog, smoke, etc.), and the like. An illustrative collection of cameras mounted on a vehicle to form a vision system will be described with regard to FIG. 2B. As previously described, vehicles 102 will rely on such vision systems for defined vehicle operational functions without assistance from or in place of other traditional detection systems.

In yet another aspect, the local sensors can include one or more positioning systems that can obtain reference information from external sources that allow for various levels of accuracy in determining positioning information for a vehicle. For example, the positioning systems can include various hardware and software components for processing information from GPS sources, Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle, specifically elevation at a current location. In other embodiments, the positioning systems can also determine travel-related operational parameters, such as direction of travel, velocity, acceleration, and the like. The positioning system may be configured as part of a vehicle for multiple purposes including self-driving applications, enhanced driving or user-assisted navigation, and the like. Illustratively, the positioning systems can include processing components and data that facilitate the identification of various vehicle parameters or process information.

In still another aspect, the local sensors can include one or more navigations system for identifying navigation related information. Illustratively, the navigation systems can obtain positioning information from positioning systems and identify characteristics or information about the identified location, such as elevation, road grade, etc. The navigation systems can also identify suggested or intended lane location in a multi-lane road based on directions that are being provided or anticipated for a vehicle user. Similar to the location systems, the navigation system may be configured as part of a vehicle for multiple purposes including self-driving applications, enhanced driving or user-assisted navigation, and the like. The navigation systems may be combined or integrated with positioning systems. Illustratively, the positioning systems can include processing components and data that facilitate the identification of various vehicle parameters or process information.

The local resources further include one or more processing component(s) 214 that may be hosted on the vehicle or a computing device accessible by a vehicle (e.g., a mobile computing device). The processing component(s) can illustratively access inputs from various local sensors or sensor systems and process the inputted data as described herein. For purposes of the present application, the processing component(s) will be described with regard to one or more functions related to illustrative aspects. For example, processing component(s) in vehicles 102 will collect and transmit the first data set corresponding to the collected vision information.

The environment can further include various additional sensor components or sensing systems operable to provide information regarding various operational parameters for use in accordance with one or more of the operational states. The environment can further include one or more control components for processing outputs, such as transmission of data through a communications output, generation of data in memory, transmission of outputs to other processing components, and the like.

Figure 2B:
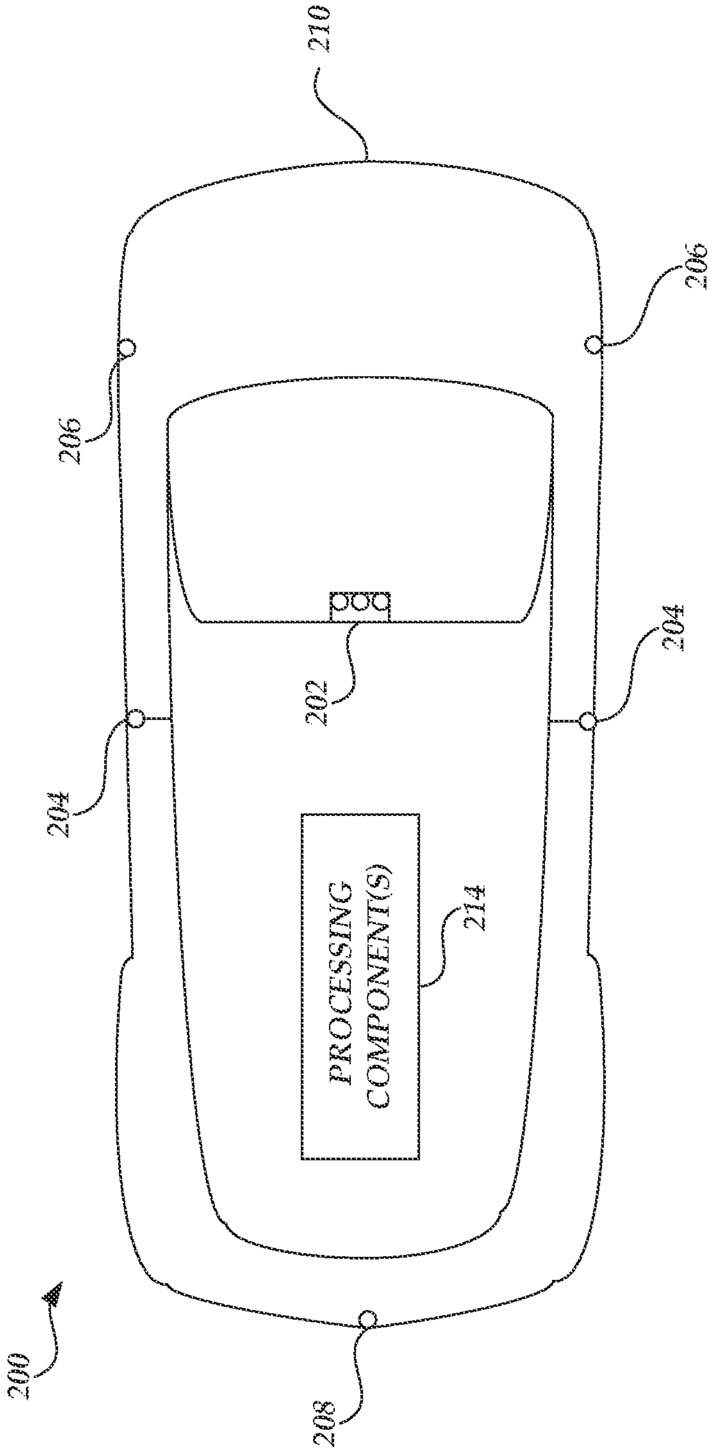
FIG. 2B an illustrative vision system for a vehicle in accordance with one or more aspects of the present application.

With reference now to FIG. 2B, an illustrative vision system 200 for a vehicle will be described. The vision system 200 includes a set of cameras that can capture image data during the operation of a vehicle. As described above, individual image information may be received at a particular frequency such that the illustrated images represent a particular time stamp of images. In some embodiments, the image information may represent high dynamic range (HDR) images. For example, different exposures may be combined to form the HDR images. As another example, the images from the image sensors may be pre-processed to convert them into HDR images (e.g., using a machine learning model).

As illustrated in FIG. 2B, the set of cameras can include a set of front facing cameras 202 that capture image data. The front facing cameras may be mounted in the windshield area of the vehicle to have a slightly higher elevation. As illustrated in FIG. 2B, the front facing cameras 202 can including multiple individual cameras configured to generate composite images. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow lens. In this way, three images of varying focal lengths may be obtained in the forward direction by the vehicle. The vision system 200 further includes a set of cameras 204 mounted on the door pillars of the vehicle. The vision system 200 can further include two cameras 206 mounted on the front bumper of the vehicle. Additionally, the vision system 200 can include a rearward facing camera 208 mounted on the rear bumper, trunk or license plate holder.

The set of cameras 202, 204, 206, and 208 may all provide captured images to one or more processing components 214, such as a dedicated controller/embedded system. For example, the processing component 214 may include one or more matrix processors which are configured to rapidly process information associated with machine learning models. The processing component 212 may be used, in some embodiments, to perform convolutions associated with forward passes through a convolutional neural network. For example, input data and weight data may be convolved. The processing component 212 may include a multitude of multiply-accumulate units which perform the convolutions. As an example, the matrix processor may use input and weight data which has been organized or formatted to facilitate larger convolution operations. Alternatively, the image data may be transmitted to a general-purpose processing component.

Illustratively, the individual cameras may operate, or be considered individually, as separate inputs of visual data for processing. In other embodiments, one or more subsets of camera data may be combined to form composite image data, such as the trio of front facing cameras 202. As further illustrated in FIG. 2B, in embodiments related to vehicles incorporating vision only systems, such as vehicles 102, no detection systems would be included at 210.

Figure 3:
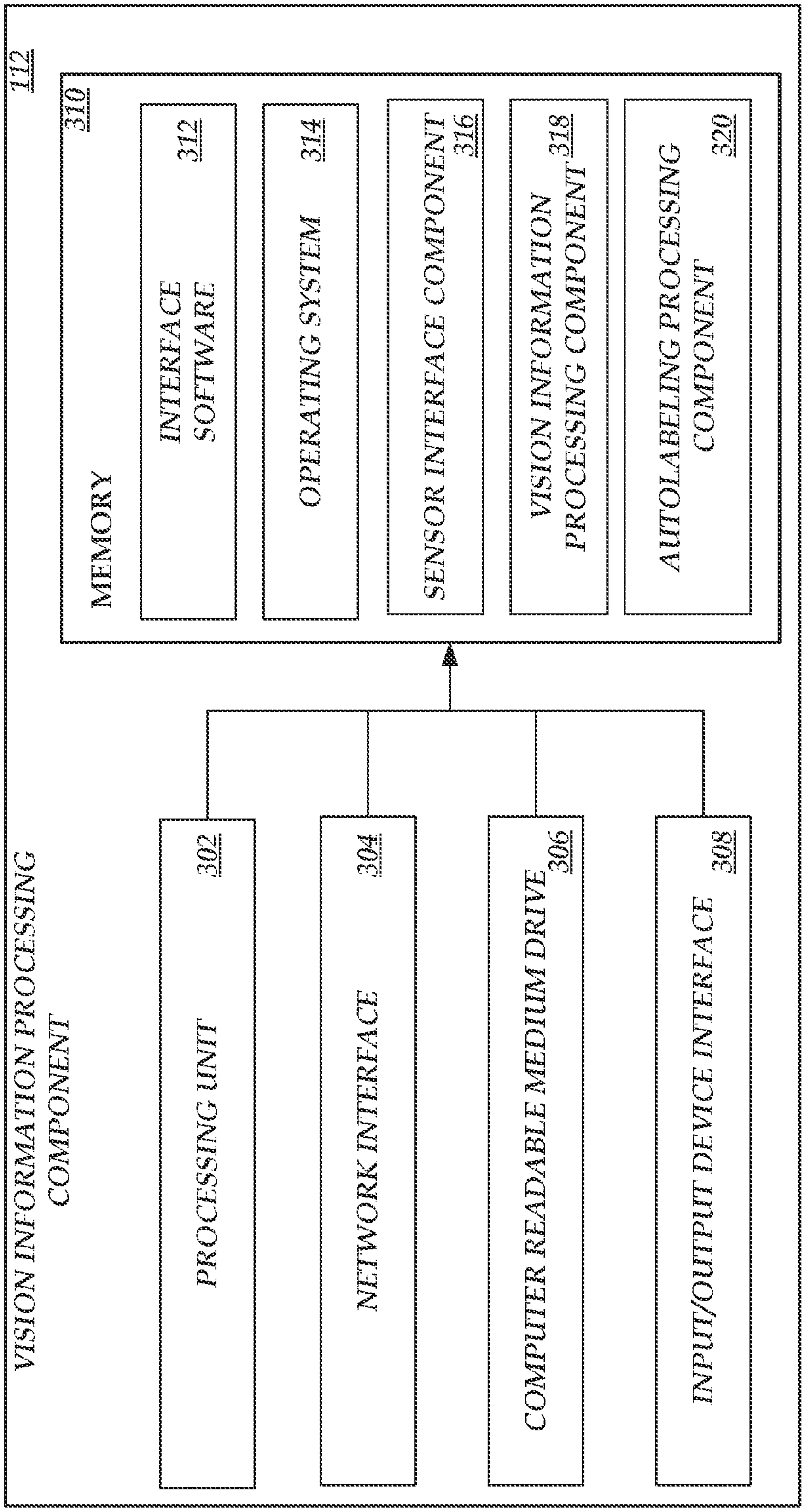
FIG. 3 depicts an illustrative architecture for implementing a vision information processing component in accordance with aspects of the present application.

With reference now to FIG. 3, an illustrative architecture for implementing the vision information processing component 112 on one or more local resources or a network service will be described. The vision information processing component 112 may be part of components/systems that provide functionality associated with the machine learned algorithms for object recognition, navigation, locations services, and the like.

The architecture of FIG. 3 is illustrative in nature and should not be construed as requiring any specific hardware or software configuration for the vision information processing component 112. The general architecture of the vision information processing component 112 depicted in FIG. 3 includes an arrangement of computer hardware and software components that may be used to implement aspects of the present disclosure. As illustrated, the vision information processing component 112 includes a processing unit 302, a network interface 304, a computer readable medium drive 306, and an input/output device interface 308, all of which may communicate with one another by way of a communication bus. The components of the vision information processing component 112 may be physical hardware components or implemented in a virtualized environment.

The network interface 304 may provide connectivity to one or more networks or computing systems, such as the network of FIG. 1. The processing unit 302 may thus receive information and instructions from other computing systems or services via a network. The processing unit 302 may also communicate to and from memory 310 and further provide output information for an optional display (not shown) via the input/output device interface 308. In some embodiments, the vision information processing component 112 may include more (or fewer) components than those shown in FIG. 3.

The memory 310 may include computer program instructions that the processing unit 302 executes in order to implement one or more embodiments. The memory 310 generally includes RAM, ROM, or other persistent or non-transitory memory. The memory 310 may store interface software 312 and an operating system 314 that provides computer program instructions for use by the processing unit 302 in the general administration and operation of the vision information processing component 112. The memory 310 may further include computer program instructions and other information for implementing aspects of the present disclosure. For example, in one embodiment, the memory 310 includes a sensor interface component 316 that obtains information (e.g., captured video information) from vehicles, such as vehicles 102, data stores, other services, and the like.

The memory 310 further includes a vision information processing component 318 for obtaining and processing the captured vision system information and generating additional or alternative ground truth label information for the captured vision information in accordance with various operational states of the vehicle as described herein. The memory 310 can further include an auto labeling processing component 320 for automatically generating labels for use in training machine learned algorithms as described herein. Illustratively, in one embodiment, the vision information processing component 112 can train a number of machine learned algorithms, such as for static object detection, dynamic object detection, and the like.

Figure 4A:
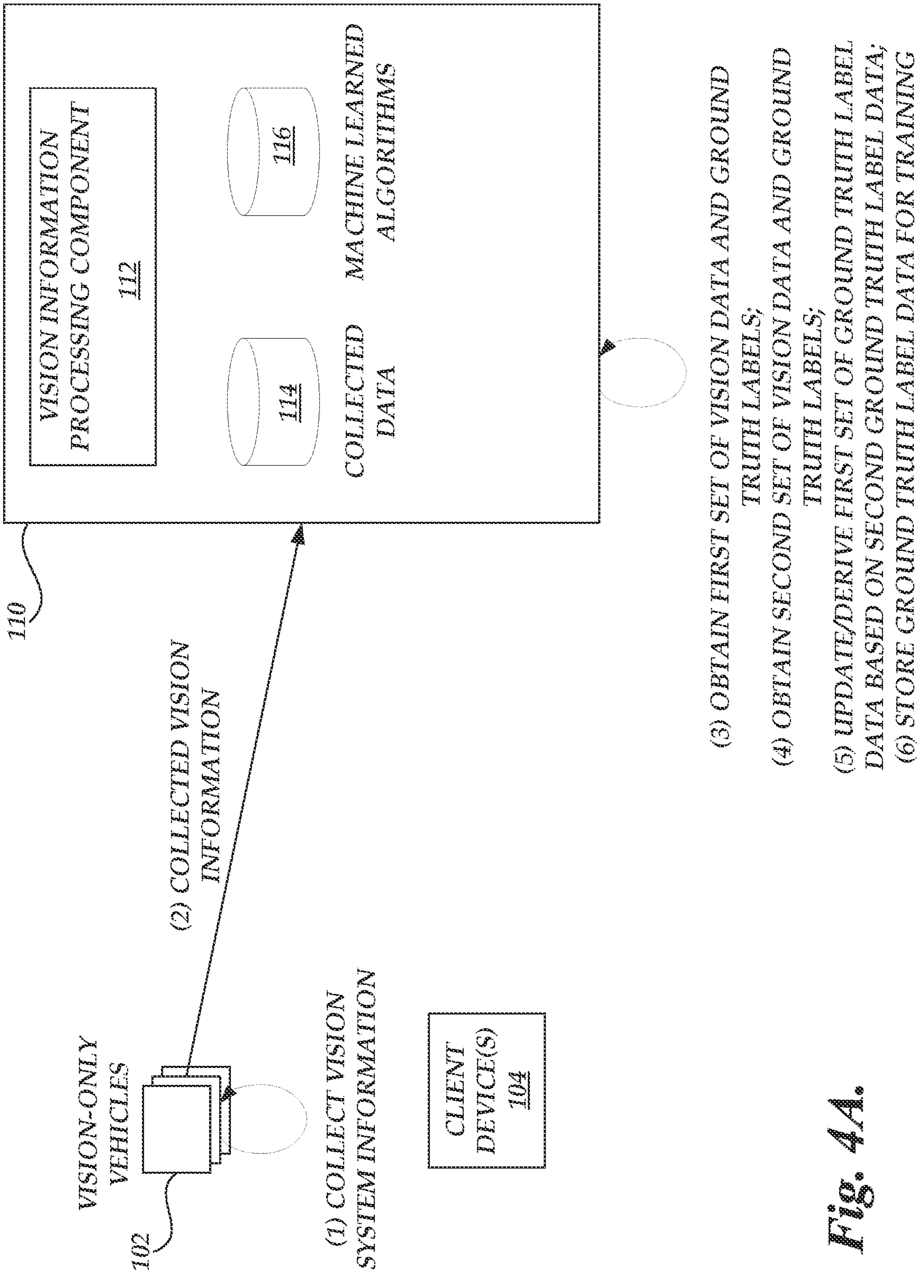
FIGS. 4A-4B are block diagrams of the illustrative environment of FIG. 1 illustrated the generation of vision system training data for machine learning algorithms based on simulate model content.
Figure 4B:
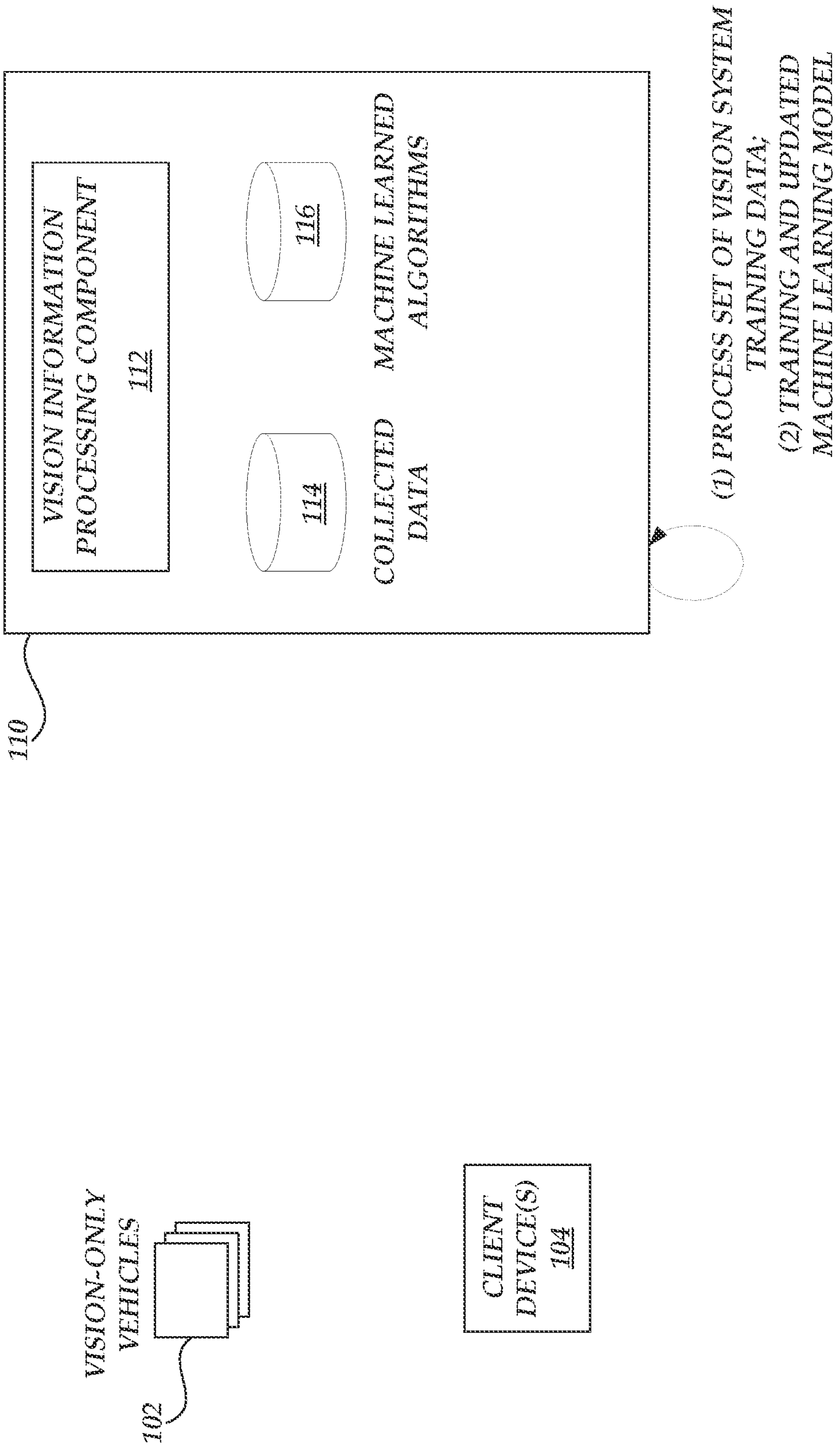

Turning now to FIGS. 4A-4B, illustrative interactions for the components of the environment to process vision system data and generate simulated content system data to update training models for machine learning algorithms will be described. At (1), one or more vehicles 102 can collect and transmit a set of inputs (e.g., the first data set). The first set of data illustratively corresponds to the video image data and any associated metadata or other attributes collected by the vision system 200 of the vehicle 102.

Illustratively, the vehicles 102 may be configured to collect vision system data and transmit the collected data. Illustratively, the vehicles 102 may include processing capabilities in vision systems to generate, at least in part, ground truth label information for the captured vision system information. In other embodiments, the vehicles 102 may transmit captured vision system information (with or without any ground truth labels) to another service, such as in the network 110. The additional services can then add (manually or automatically) ground truth label information. For example, the collected vision system data may be transmitted based on periodic timeframes or various collection/transmission criteria. Still further, in some embodiments, the vehicles 102 may also be configured to identify specific scenarios or locations, such as via geographic coordinates or other identifiers, that will result in the collection and transmission of the collected data.

Illustratively, the network service receives and processes the collected vision system data and ground truth labels from the vehicles 102. More specifically, at (3), a network service can receive a first set of inputs (e.g., a first data set) from a target vehicle including captured vision system data at a first point in time. The network service then processes at least the ground truth label data associated with the captured vision system data to determine an initial set of ground truth labels and values. The processed first captured vision system data at a first point in time can form an initial set of ground truth labels and values that can include one or more indeterminate values or multiple possible values. The generation of the first set of ground truth label data may be based on one or more machine learned algorithms.

At (4) network service can receive a second set of inputs (e.g., a second data set) from the target vehicle including captured vision system data at a second point in time. The second point in time is subsequent to the first point in time. In one embodiment, the capture of the first and second vision system data can be based on a frequency of capture. For example, the vision systems of the vehicle 102 may capture based on frequency of capture of 20 Hz, 21 Hz, 22 Hz, 23 Hz, 24 Hz, 25 Hz, 26 Hz, 27 Hz, 28 Hz, 29 Hz, 30 Hz, 40 Hz (and all intervening values in between); 50 Hz (and all intervening values therein), 60 Hz (and all intervening values therein), 70 Hz (and all intervening values therein), 80 Hz (and all intervening values therein), 90 Hz (and all intervening values therein), and the like. The network service then processes at least the ground truth label data associated with the captured vision system data to determine a second set of ground truth labels and values.

At (5), based on the second set of ground truth labels and values, the network service can then determine labels and associated values for the first set of ground truth labels and values. More specifically, the network service can utilize the known ground truth labels and values resulting of the later point in time to determine or update what the processing of the vision system data of the earlier point of time should have been. For example, ground truth data at the first instance that related multiple potential directional attributes (e.g., yaw rate) would be resolved to the appropriate yaw rate that results in the appropriate end location. In another example, ground truth label values related to positional calculated values for detected objects can be resolved based on determination of positional values in the second point of time. In this embodiment, the network service is illustratively deriving or validating the ground truth labels and values for the first set of data by using the known results provided by the second set of captured video data. The specific process for deriving the values can be based on the type of ground truth label data. For example, deriving positional estimates for detection object(s) can be based on the measured positional values for the detected object in the second set of captured vision data (e.g., actual location). In another example, deriving velocity estimates can be based on calculating positional data and expired time in the second set of captured vision data. In still other embodiments, the deriving identification of static objects or dynamic objects can be based on matching or updating the identified static object or dynamic object from the second set of captured vision data. Accordingly, one skilled in the relevant art will appreciate that various techniques may be applied for the first and second set of vision data at (5).

At (6), the resulting ground truth labels and values may be stored. Additionally, the labels and values may be transmitted or otherwise made available to additional services.

Turning now to FIG. 4B, once the vision information processing component 112 vision information processing component 112 receives the training set, at (1) the network service 110 processes the training sets. At (2), the vision information processing component 112 generates an updated machine learned algorithm based on training on the combined data set. Illustratively, the network service 110 can utilize a variety of machine learning models to generate updated machine learned algorithms.

Figure 5:
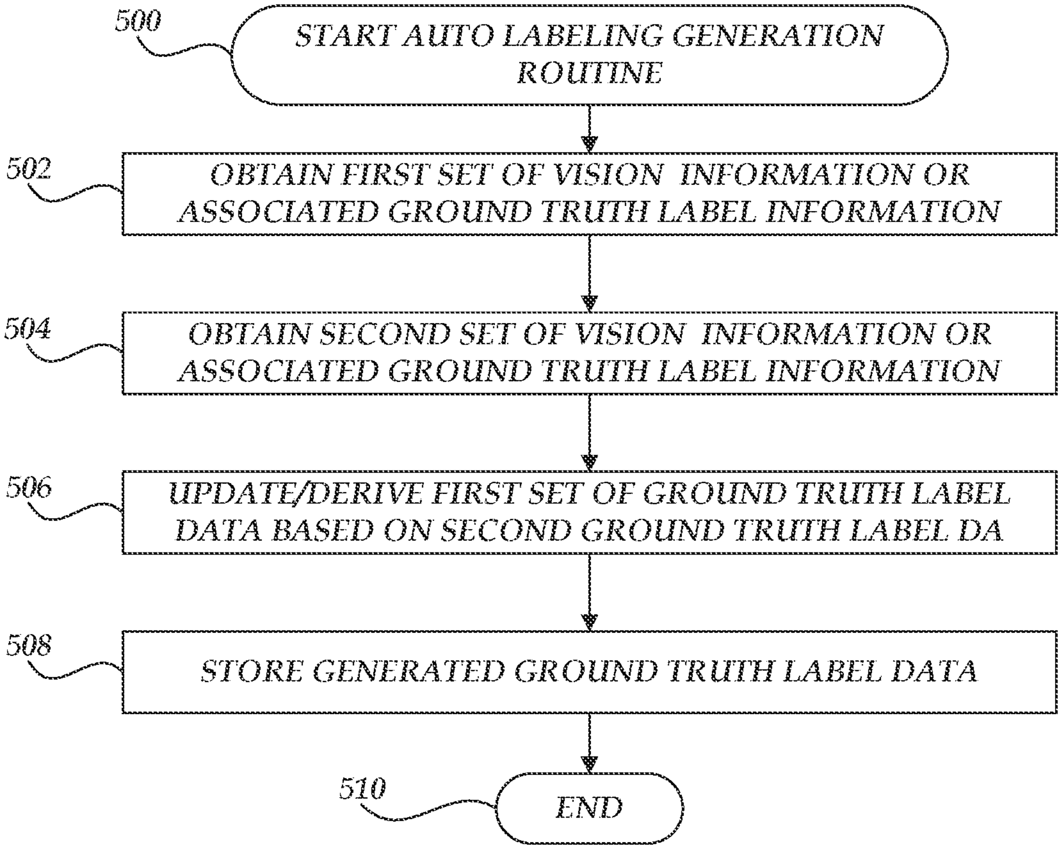
FIG. 5 is a flow diagram illustrative of a simulated model content generation routine implemented by a simulated content service in accordance with illustrative embodiments.

Turning now to FIG. 5, a routine 500 for processing collected vision for providing auto labeling will be described. Routine 500 is illustratively implemented by the vision information processing component 112. As described above, routine 500 may be implemented after the target vehicle(s) 102 including vision system data and ground truth label data for the captured vision system data is available for processing. Illustratively, the vehicles 102 may be configured to collect vision system data and transmit the collected data and associated ground truth labels. For example, the collected vision system data may be transmitted based on periodic timeframes or various collection/transmission criteria. Still further, in some embodiments, the vehicles 102 may also be configured to identify specific scenarios or locations, such as via geographic coordinates or other identifiers, that will result in the collection and transmission of the collected data. In other embodiments, the vehicles 102 may transmit captured vision system information (with or without any ground truth labels) to another service, such as in the network 110. The additional services can then add (manually or automatically) ground truth label information. Illustratively, the vision information processing component 112 receives and processes the collected vision system data and ground truth labels from the vehicles 102.

More specifically, at block 502, the vision information processing component 112 can receive a first set of inputs (e.g., a first data set) from a target vehicle including captured vision system data at a first point in time. The network service then processes at least the ground truth label data associated with the captured vision system data to determine an initial set of ground truth labels and values. The processed first captured vision system data at a first point in time can form an initial set of ground truth labels and values that can include one or more indeterminate values or multiple possible values. The generation of the first set of ground truth label data may be based on one or more machine learned algorithms.

At block 504, the vision information processing component 112 can receive a second set of inputs (e.g., a second data set) from the target vehicle including captured vision system data at a second point in time. The second point in time is subsequent to the first point in time. In one embodiment, the capture of the first and second vision system data can be based on a frequency of capture. For example, the vision systems of the vehicle 102 may capture based on frequency of capture of 20 Hz (and all intervening values therein), 30 Hz (and all intervening values therein), 40 Hz (and all intervening values in between); 50 Hz (and all intervening values therein), 60 Hz (and all intervening values therein), 70 Hz (and all intervening values therein), 80 Hz (and all intervening values therein), 90 Hz (and all intervening values therein), and the like. The vision information processing component 112 then processes at least the ground truth label data associated with the captured vision system data to determine a second set of ground truth labels and values.

At block 506, based on the second set of ground truth labels and values, the vision information processing component 112 can then determine labels and associated values for the first set of ground truth labels and values. More specifically, the network service can utilize the known ground truth labels and values resulting of the later point in time to determine or update what the processing of the vision system data of the earlier point of time should have been. For example, ground truth data at the first instance that related multiple potential directional attributes (e g., yaw rate) would be resolved to the appropriate yaw rate that results in the appropriate end location. In another example, ground truth label values related to positional calculated values for detected objects can be resolved based on determination of positional values in the second point of time. In this embodiment, the network service is illustratively deriving or validating the ground truth labels and values for the first set of data by using the known results provided by the second set of captured video data. The specific process for deriving the values can be based on the type of ground truth label data. For example, deriving positional estimates for detection object(s) can be based on the measured positional values for the detected object in the second set of captured vision data (e.g., actual location). In another example, deriving velocity estimates can be based on calculating positional data and expired time in the second set of captured vision data. In still other embodiments, the deriving identification of static objects or dynamic objects can be based on matching or updating the identified static object or dynamic object from the second set of captured vision data. Accordingly, one skilled in the relevant art will appreciate that various techniques may be applied for the first and second set of vision data at block 506.

At block 508, the resulting ground truth labels and values may be stored. Additionally, the labels and values may be transmitted or otherwise made available to additional services. Routine 500 terminates at block 510. As described above, the vision information processing component 112 generates an updated machine learned algorithm based on training on the combined data set. Illustratively, the vision information processing component 112 can utilize a variety of machine learning models to generate updated machine learned algorithms. For example, multiple machine learned algorithms may be formed based on types of detected object or ground truth labels.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed decision and control algorithms. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer those two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system for managing vision systems in vehicles, the system comprising:

a plurality of vehicles including systems for generating and processing vision data captured from one or more vision systems according to at least one machine learned algorithm, wherein the vision data captured from one or more vision systems is associated with ground truth labels;

one or more computing systems including processing devices and memory, that execute computer-executable instructions, for implementing a vision system information processing component that is operative to generate the at least one machine learned algorithm for execution by the plurality of vehicles, the at least one machine learned algorithm generated from a set of training data; and one or more computing systems including processing devices and memory, that execute computer-executable instructions, for implementing a vision system processing service operative to:

obtain first vision system capture information associated with images captured in the operation of a vehicle, the first vision system capture information associated with a first instance of time;

obtain second vision system capture information associated with images captured in the operation of the vehicle, the second vision system capture information associated with a second instance of time, the second instance of time subsequent to the first instance of time;

obtain ground truth data labels and values associated with the second vision system capture information;

at least one of determine or update ground truth data labels and values associated with the first vision system capture information based on the obtained ground truth data labels and values associated with the second vision system capture information to determine or update what at least one indeterminate value within the ground truth data labels and values associated with the first vision system capture information associated with the first instance of time should have been; and store a set of ground truth labels and values for the first and second instance of time, the set of ground truth labels and values comprising the determined or updated ground truth data labels and values associated with the first vision system capture information.

2. The system as recited in claim 1, wherein the ground truth data labels and values correspond to velocity.

3. The system as recited in claim 1, wherein the ground truth data labels and values correspond to yaw.

4. The system as recited in claim 1, wherein the ground truth data labels and values correspond to position for detected objects.

5. The system as recited in claim 1, wherein the vision system processing service operative to determine the ground truth data labels and values associated with the second vision system capture information.

6. A method for managing vision systems in vehicles, the method comprising:

obtaining first vision system capture information associated with images captured in the operation of a vehicle, the first vision system capture information associated with a first instance of time;

obtaining second vision system capture information associated with images captured in the operation of the vehicle, the second vision system capture information associated with a second instance of time, the second instance of time subsequent to the first instance of time;

obtaining ground truth data labels and values associated with the second vision system capture information;

at least one of determining or updating ground truth data labels and values associated with the first vision system capture information based on the obtained ground truth data labels and values associated with the second vision system capture information to determine or update what at least one indeterminate value within the ground truth data labels and values associated with the first vision system capture information associated with the first instance of time should have been; and storing a set of ground truth labels and values for the first and second instance of time, the set of ground truth labels and values comprising the determined or updated ground truth data labels and values associated with the first vision system capture information.

7. The method as recited in claim 6, wherein the ground truth data labels and values correspond to velocity.

8. The method as recited in claim 6, wherein the ground truth data labels and values correspond to yaw.

9. The method as recited in claim 6, wherein the ground truth data labels and values correspond to position for detected objects.

10. The method as recited in claim 6, further comprising determining the ground truth data labels and values associated with the second vision system capture information.

11. The method as recited in claim 6, wherein obtaining first vision system capture information associated with images captured in the operation of a vehicle, the first vision system capture information associated with a first instance of time and obtaining second vision system capture information associated with images captured in the operation of the vehicle, the second vision system capture information associated with a second instance of time, the second instance of time subsequent to the first instance of time is based on a capture rate.

12. The method as recited in claim 11, wherein the capture rate is 24 hertz.

13. A method for managing vision systems in vehicles, the method comprising:

obtaining ground truth data labels and values associated with first and second vision system capture information, wherein the first vision system capture information associated with a first instance of time and wherein the second vision system capture information associated with a second instance of time, the second instance of time subsequent to the first instance of time;

updating ground truth data labels and values associated with the first vision system capture information based on the obtained ground truth data labels and values associated with the second vision system capture information to update what at least one indeterminate value within the ground truth data labels and values associated with the first vision system capture information associated with the first instance of time should have been; and storing a set of ground truth labels and values for the first and second instance of time, the set of ground truth labels and values comprising the updated ground truth data labels and values associated with the first vision system capture information.

14. The method as recited in claim 13, wherein the ground truth data labels and values correspond to at least one of velocity, yaw, or position for detected objects.

15. The method as recited in claim 13, further comprising determining an initial set of ground truth data labels and values associated with the first vision system capture information prior to obtaining the ground truth data labels and values associated with the second vision system capture information.

16. The method as recited in claim 13, further comprising determining the ground truth data labels and values associated with the second vision system capture information.

17. The method as recited in claim 13, further comprising obtaining first vision system capture information associated with images captured in the operation of a vehicle.

18. The method as recited in claim 17, further comprising obtaining second vision system capture information associated with images captured in the operation of the vehicle, the second vision system capture information based on a capture rate.

* * * * *